United States Patent (12)
Nagano et al.

(10) Patent No.: US 7,940,993 B2
(45) Date of Patent: May 10, 2011

(54) LEARNING DEVICE, LEARNING METHOD, AND LEARNING PROGRAM

(75) Inventors: Takahiro Nagano, Kanagawa (JP); Tetsujiro Kondo, Tokyo (JP); Tsutomu Watanabe, Kanagawa (JP); Junichi Ishibashi, Saitama (JP); Hisakazu Shiraki, Kanagawa (JP); Naoki Fujiwara, Tokyo (JP); Masanori Kanemaru, Kanagawa (JP); Shinichiro Kaneko, Tokyo (JP); Yasuhiro Suto, Tokyo (JP)

(73) Assignee: Sony Corporation, Tokyo (JP)

( * ) Notice: Subject to any disclaimer, the term of this patent is extended or adjusted under 35 U.S.C. 154(b) by 994 days.

(21) Appl. No.: 11/722,141
(22) PCT Filed: Dec. 21, 2005
(86) PCT No.: PCT/JP2005/023997
§ 371 (c)(1),
(2), (4) Date: Jun. 19, 2007
(87) PCT Pub. No.: WO2006/068289
PCT Pub. Date: Jun. 29, 2006

(65) Prior Publication Data
US 2008/0075362 A1 Mar. 27, 2008

(30) Foreign Application Priority Data
Dec. 21, 2004 (JP) ................................. 2004-369268

(51) Int. Cl.
G06K 9/40 (2006.01)
G06K 9/00 (2006.01)
H04N 5/228 (2006.01)
(52) U.S. Cl. .................. 382/255; 382/107; 348/208.12; 348/208.99
(58) Field of Classification Search .................. 382/107, 382/255; 348/208.12, 208.99
See application file for complete search history.

(56) References Cited

U.S. PATENT DOCUMENTS
5,751,376 A * 5/1998 Hirai .............................. 348/579
(Continued)

FOREIGN PATENT DOCUMENTS
JP 2001 250119 9/2001
JP 2002 373336 12/2002
JP 2003 233817 8/2003

OTHER PUBLICATIONS
U.S. Appl. No. 11/793,701, filed Jun. 21, 2007, Nagano, et al.
U.S. Appl. No. 11/722,450, filed Jun. 21, 2007, Nagano, et al.
U.S. Appl. No. 11/722,436, filed Jun. 21, 2007, Nagano, et al.

Primary Examiner — Jingge Wu
Assistant Examiner — Utpal Shah
(74) Attorney, Agent, or Firm — Oblon, Spivak, McClelland, Maier & Neustad, L.L.P.

(57) ABSTRACT

A motion-setting section (61) sets a motion amount and a motion direction for obtaining processing coefficients. A student-image-generating section (62) generates student images obtained by adding a motion blur to a teacher image not only based on the set motion amount and the set motion direction but also by changing at least one of the motion amount and motion direction in a specific ratio and student images obtained by adding no motion blur to the teacher image. A prediction-tap-extracting section (64) extracts, in order to extract a main term that mainly contains component of the target pixel, at least a pixel value of pixel in the student image whose space position roughly agrees with space position of the target pixel in the teacher image. A processing-coefficient-generating section (65) generates processing coefficients for predicting the target pixels in the teacher images from the pixel values of extracted pixels based on a relationship between the pixels thus extracted and the target pixels in the teacher images. The processing coefficients that are suitable for any motion blur removing which is robust against any shift of the motion vector can be generated through learning.

8 Claims, 20 Drawing Sheets

U.S. PATENT DOCUMENTS

| | | | |
|---|---|---|---|
| 2003/0011717 A1* | 1/2003 | McConica | 348/699 |
| 2004/0075749 A1* | 4/2004 | Kondo et al. | 348/222.1 |
| 2004/0081335 A1* | 4/2004 | Kondo et al. | 382/107 |
| 2004/0105493 A1* | 6/2004 | Kondo et al. | 375/240.08 |

* cited by examiner

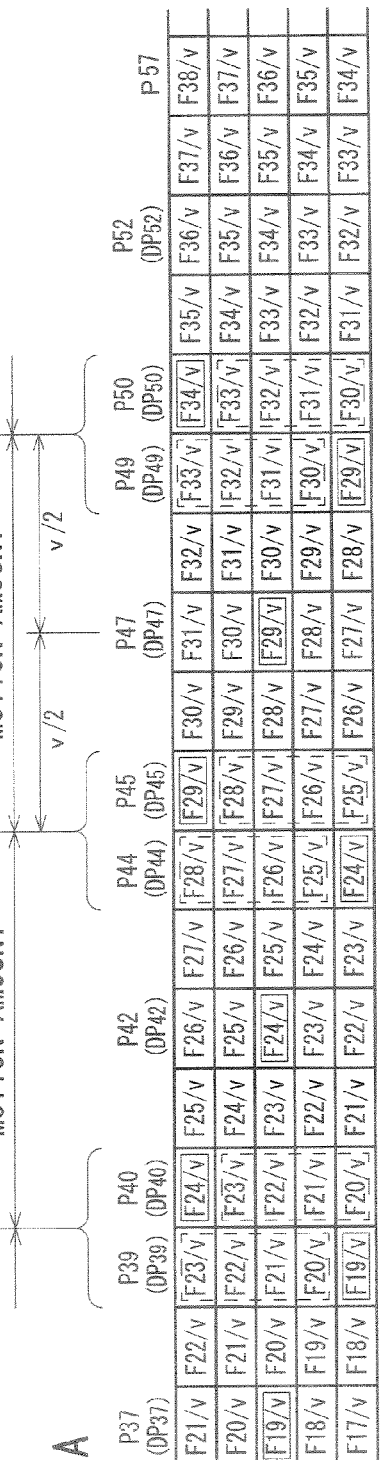
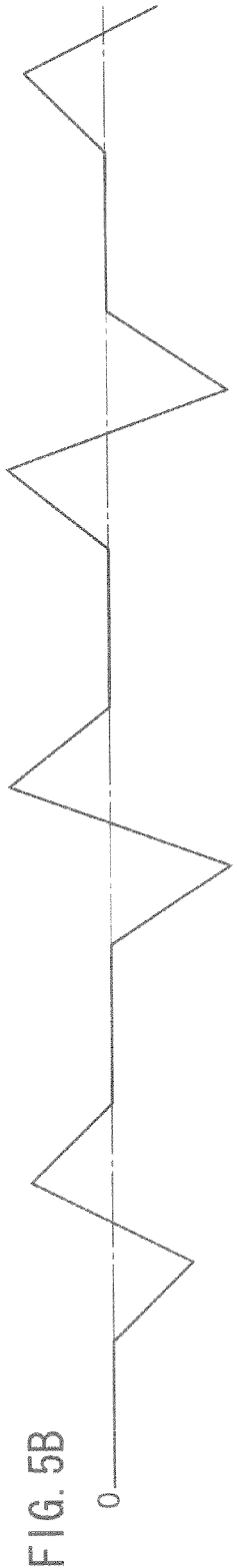
FIG. 5A
FIG. 5B

| $DP_{L-U}$ | $DP_{C-U}$ | $DP_{R-U}$ |
| --- | --- | --- |
| $DP_L$ | $DP_C$ | $DP_R$ |
| $DP_{L-L}$ | $DP_{C-L}$ | $DP_{R-L}$ |

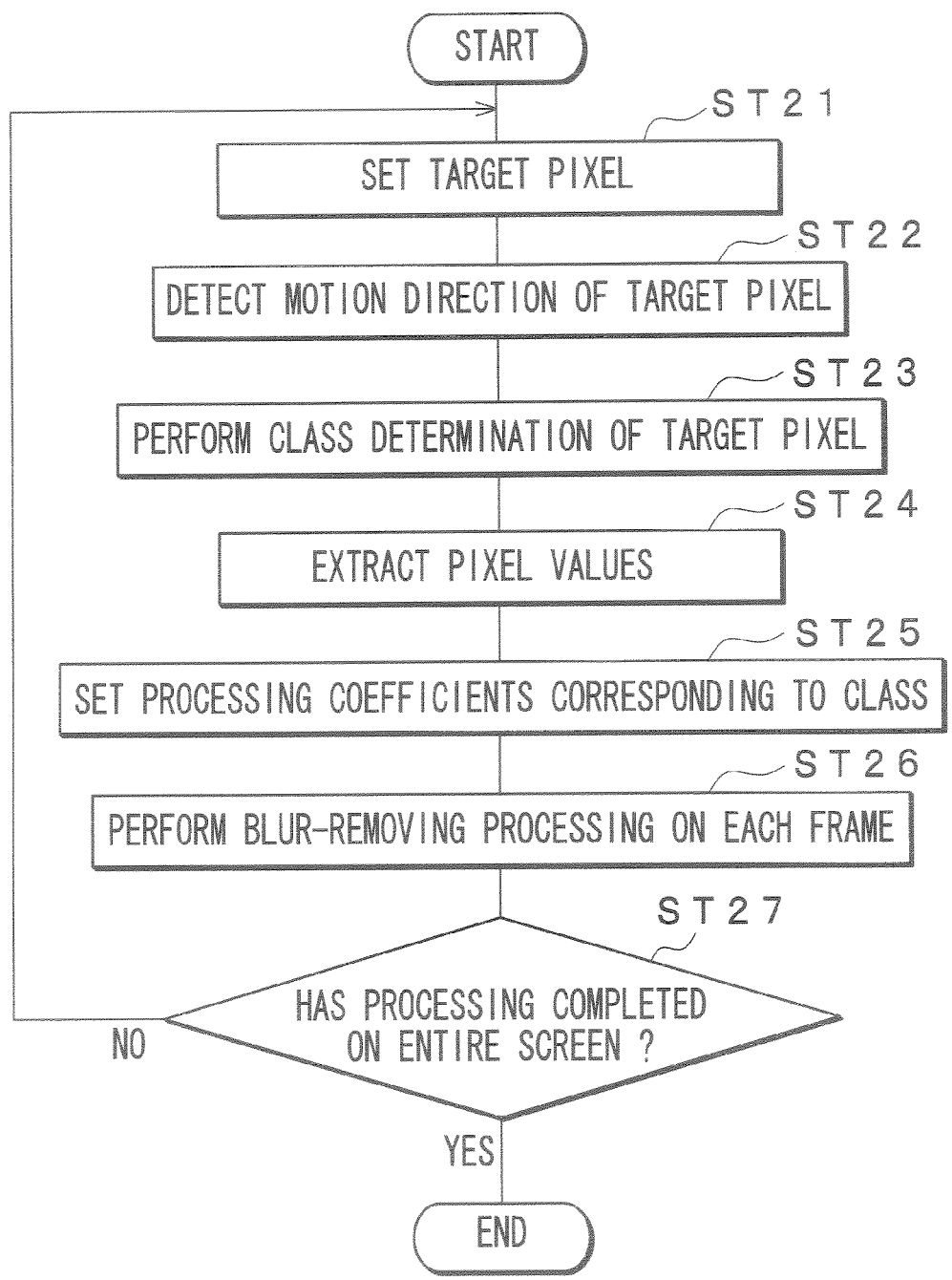

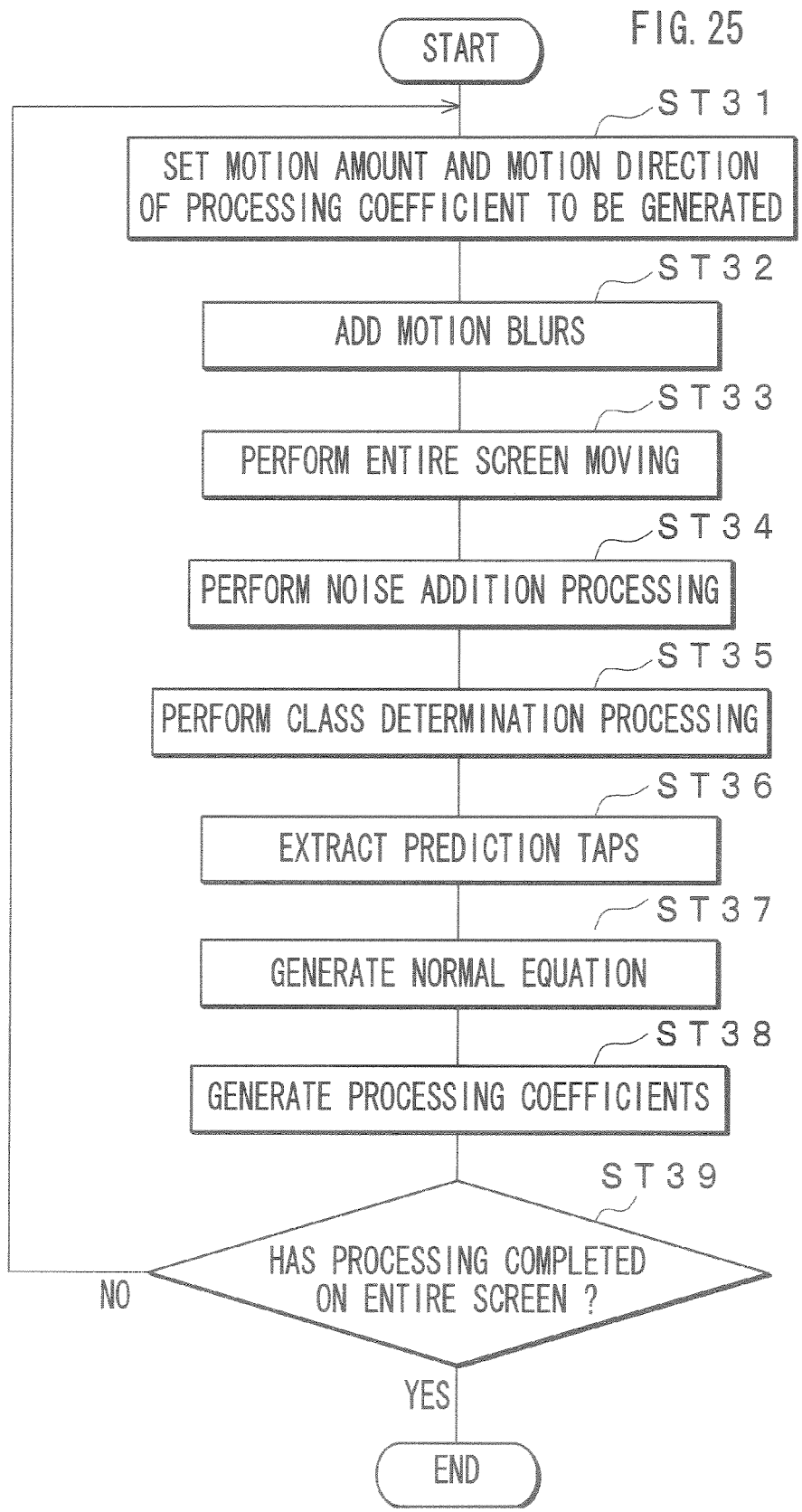

LEARNING DEVICE, LEARNING METHOD, AND LEARNING PROGRAM

TECHNICAL FIELD

The present invention relates to a learning apparatus, a learning method, and a learning program. More specifically, based on the set motion amount and motion direction, by adding any motion blur into a teacher image, student images are generated so that a class of a target pixel is determined based on pixel values of pixels in the student images that correspond to the target pixel in the teacher image. Further, in order to extract a main term that mainly contains components of the target pixel in a moving object that encounters a motion blur in the student images, at least pixel values of pixels in the student images whose space positions roughly agree with that of the target pixel in the teacher image are extracted. From a relationship between the extracted pixel values and the target pixel in the teacher image, processing coefficients to predict the target pixel in the teacher image are generated based on the extracted pixel values for each detected class. In this generation of student images, the student images are generated by switching at least any one of the motion amount and the motion direction at a specific ratio.

BACKGROUND ART

Conventionally, an event in a real world has been converted into data by using a sensor. The data acquired by using the sensor is information that is obtained by projecting information of the real world (e.g., light) onto a space and time having a lower number of dimensions than the real world. Accordingly, the information obtained by projection has any distortion that occurs through projection. For example, in he case of imaging, by using a video camera, a moving object in front of a background at rest and converting it into data as an image signal, information of the real world is sampled and converted into data so that an image which is displayed on the basis of the image signal encounters a motion blur that the moving object blurs as distortion that occurs through projection.

Accordingly as disclosed in Japanese Patent Application Publication No. 2001-250119 (Corresponding U.S. patent application Ser. No. 09/830858, Corresponding EP Patent Application Publication No. EP1164545), for example, by detecting a profile of an image object that corresponds to an object in a foreground contained in an input image, the image object that corresponds to the object in the foreground is coarsely extracted to detect a motion vector of the image object corresponding to the object in the foreground that is coarsely extracted, so that the detected motion vector and its position information may be used to mitigate a motion blur.

DISCLOSURE OF THE INVENTION

By the way, in the conventional motion blur removing, any space processing corresponding to a blur amount of a portion of an input signal at which a motion blur occurs has been performed, thereby enabling the blur to be removed. Spatially completed processing similar to it, however, has been also performed on a motion image, so that accuracy of motion-blur-removing processing has been very deeply influenced by accuracy of estimation of motion vector. In other words, if estimated motion vector is shifted, processing regions and/or processing coefficients to be used vary, so that a motion-blur-removed image may have a danger of failure. Further, if any time information is also used, the estimated motion vector is further shifted, so that any information on time direction cannot be utilized for such the processing usefully.

Further, even if any motion blur removing is performed on an image containing a moving object and a still object, it is impossible to obtain an excellent picked-up image from which any motion blur is removed if processing such that an image of the still object does not encounter any failure could be performed.

A learning apparatus according to the invention comprises a motion-amount-setting section that sets a motion amount, a motion-direction-setting section that sets a motion direction, a student-image-generating section that adds a motion blur to a teacher image based on the motion amount and the motion direction, to generate a student image, a prediction-tap-extracting section that extracts, in order to extract a main term that mainly contains component of the target pixel in a moving object that encounters a motion blur in the student image, at least a pixel value of pixel in the student image whose space position roughly agrees with space position of the target pixel in the teacher image, and a coefficient-generating section that generates a processing coefficient for predicting the target pixel in the teacher image from the pixel value of the pixel extracted by the prediction-tap-extracting section at least for each motion direction based on a relationship between plural pairs of the pixel value of the pixel extracted by the prediction-tap-extracting section and the target pixel in the teacher image, wherein the student-image-generating section generates student images by adding no motion blur to the teacher image, in a specific ratio.

A learning method according to the invention comprises a motion-amount-setting step of setting a motion amount, a motion-direction-setting step of setting a motion directions a student-image-generating step of adding a motion blur to a teacher image based on the motion amount and the motion direction, to generate a student image, a prediction-tap-extracting step of extracting, in order to extract a main term that mainly contains component of the target pixel in a moving object that encounters a motion blur in the student image, at least a pixel value of pixel in the student image whose space position roughly agrees with space position of the target pixel in the teacher image, and a coefficient-generating step of generating a processing coefficient for predicting the target pixel in the teacher image from the pixel value of the pixel extracted in the prediction-tap-extracting step at least for each motion direction based on a relationship between plural pairs of the pixel value of the pixel extracted by the prediction-tap-extracting section and the target pixel in the teacher image, wherein in the student-image-generating step, student images by adding no motion blur to the teacher image are generated in a specific ratio.

A learning program according to the invention allows a computer to perform a motion-amount-setting step of setting a motion amount, a motion-direction-setting step of setting a motion direction, a student-image-generating step of adding a motion blur to a teacher image based on the motion amount and the motion direction, to generate a student image, a prediction-tap-extracting step of extracting in order to extract a main term that mainly contains component of the target pixel in a moving object that encounters a motion blur in the student image, at least a pixel value of pixel in the student image whose space position roughly agrees with space position of the target pixel in the teacher image, and a coefficient-generating step of generating a processing coefficient for predicting the target pixel in the teacher image from the pixel value of the pixel extracted in the prediction-tap-extracting step at least for each motion direction based on a relationship between plural pairs of the pixel values of the pixels extracted by the prediction-tap-extracting step and the target pixel in the teacher image.

In the present invention, by adding a motion blur to a teacher image based on the set motion amount and motion direction, student images are generated. In this generation of the student images student images are generated in a specific ratio by adding no motion blur as setting the motion amount to be zero; by changing at least any one of the set motion amount and motion direction, student images are generated by adding a motion blur to the teacher image based on the changed motion amount or motion direction; or student images to each of which a motion blur is added are generated. Further, in order to extract a main term that mainly contains component of the target pixel in a moving object that encounters a motion blur in the student usages, at least pixel values of pixels in the student images whose space positions roughly agree with space position of the target pixel in the teacher image are extracted. In this extraction of the pixel values, pixel values of first plural pixels in the student images are extracted when the student images have an interlace format. Alternatively, pixel values of second plural pixels in the student images are extracted when the student images have a progressive format. From a relationship between the extracted pixel values of the pixels and the target pixel in the teacher image, processing coefficients for predicting the target pixel in the teacher image are generated based on the pixel values of the extracted pixels.

Effects of Invention

According to the present invention, the student images are generated in a specific ratio by adding no motion blur to the teacher image. This enables a still image to be prevented from becoming failure even if any motion blur is removed from an image containing the still image. Further, the student images having a motion blur in a second motion direction near a first motion direction are used when prediction coefficients corresponding to the motion blur the first motion direction are generated. This enables motion blur removing to be excellently performed even if there is a case where the motion vector cannot be accurately detected. Additionally, any noise is added to the student images to generate the processing coefficients, so that if learning is executed by adding any noise that occurs in an image sensor, it is possible to mitigate any influence of the noise. When adjusting noise amount, it is also possible to change a blur feeling to another or when adjusting a ratio of student images having different blur amounts, it is possible to create a new blur feeling.

Further, since the pixel values of first plural pixels in the student images are extracted when the student images have an interlace format or the pixel values of second plural pixels in the student images are extracted when the student images have a progressive format, if an image signal having any one of the interlace format and the progressive format, any motion blur can be removed from the image based on this image signal. A class of the target pixel is also determined corresponding to an activity of pixel values of the pixels in the student images that correspond to the target pixel in the teacher image, to generate the processing coefficients for each class, so that any motion-blur-removing processing that corresponds to a picked-up image can be performed.

BRIEF DESCRIPTION OF THE DRAWINGS

FIGS. 5A and 5B are diagrams each for explaining calculation operations for a pixel value of a target pixel;
FIG. 20 is a flowchart of image processing in case where class determination is performed;
FIG. 25 is a flowchart for showing learning processing (in a case where class determination is performed).

BEST FOR CARRYING OUT THE INVENTION

Figure 1:
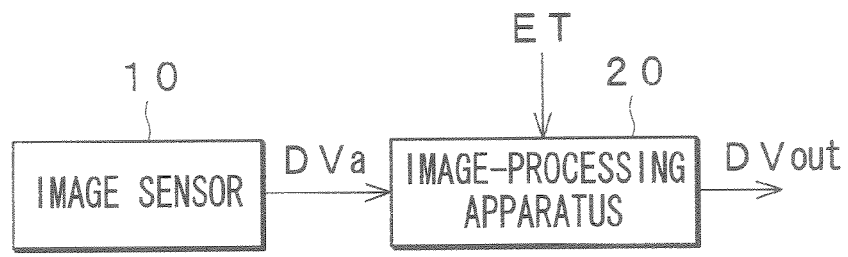
FIG. 1 is a diagram for showing a system configuration.

The following will describe one embodiment of the present invention with reference to drawings. FIG. 1 is a block diagram for showing a configuration of a system to which the present invention is applied. An image sensor 10 generates an image signal DVa by picking up an image of a real society to supply it to an image-processing apparatus 20. The image-processing apparatus 20 extracts information embedded in the supplied image signal DVa of an input image to generate an image signal from which the embedded information is extracted and outputs it. It is to be noted that the image-processing apparatus 20 is also configured so that it can extract the information embedded in the image signal DVa by using a variety of pieces of information ET supplied from outside.

Figure 2:
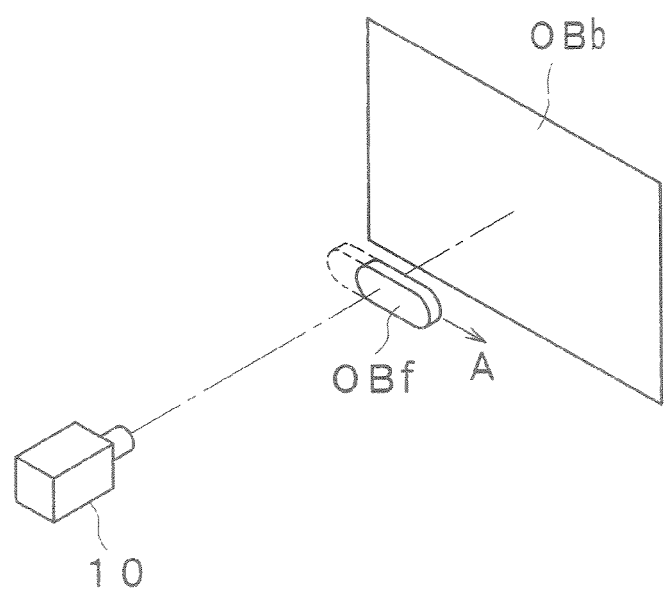
FIG. 2 is an illustration for explaining how an image sensor picks up an image.

The image sensor 10 is constituted of a video camera or the like that is equipped with a charge-coupled device (CCD) area sensor and an MOS area sensor, which are a solid-state image pickup device, and picks up an image of a real society. For example, as shown in FIG. 2, when a moving object OBf that corresponds to a foreground is moving in a direction of an arrow A between the image sensor 10 and an object OBb that corresponds to a background, the image sensor 10 picks up an image of the moving object OBf that corresponds to the foreground together with an image of the object OBb that corresponds to the background.

A detection element in the image sensor 10 converts an input light into charges during a period of time corresponding to a period of exposure tile and accumulates thus photo-electrically converted charges. A quantity of the charges is roughly proportional to an intensity of the input light and a period of time when the light is being input. During the period of time corresponding to the period of exposure time, the detection element adds charges converted from the input light to already accumulated charges. In other words, during the period of time corresponding to the period of exposure time, the detection element integrates the input light and accumulates a quantity of charges that corresponds to the integrated light. The detection element may be also said to have an integration effect on time. By, thus, performing photo-electric conversion by using the image sensor, the input light is converted into charges for each pixel, which are accumulated in units of the period of exposure time. A pixel signal is generated in accordance with the quantity of thus accumulated charges and then, by using this pixel signal, an image signal having a desired frame rate is generated, which is supplied to the image-processing apparatus. It is to be noted that the period of exposure time for the image sensor is a period of time when, as described above, the image sensor converts the input light into charges and accumulates them in its detection element, which is equal to an image time interval (e.g., a period of time for one frame) in a case where the shutter is not operated. It is also equal to a period of shutter-open time in a case where the shutter is operated.

Figure 3:
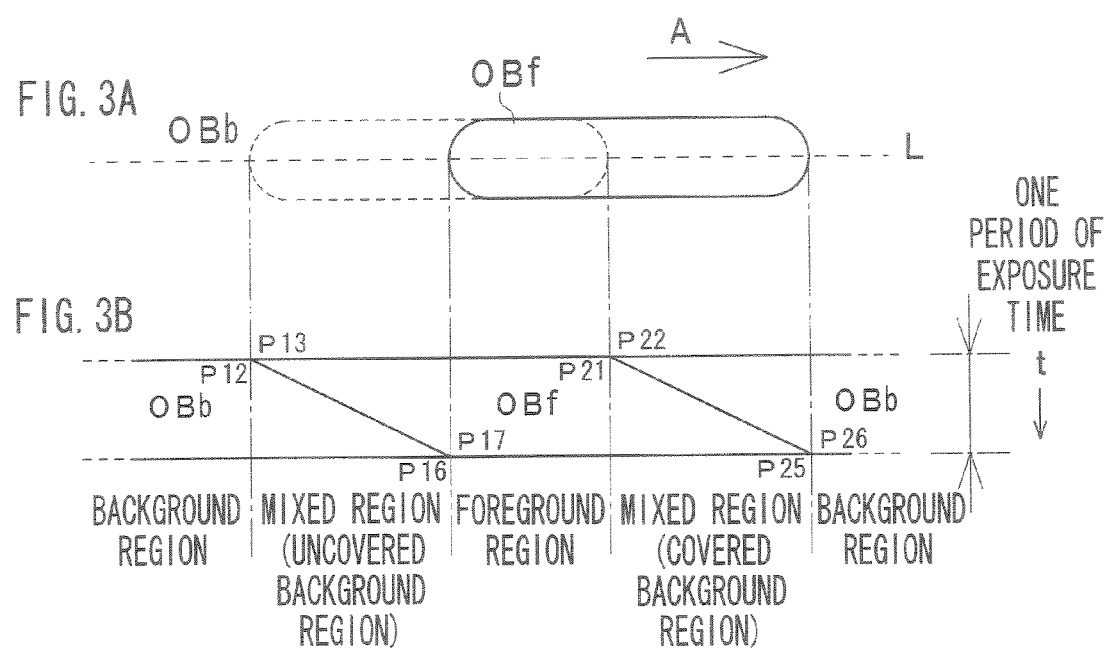
FIGS. 3A and 3B are diagrams each for explaining a picked-up image.

FIGS. 3A and 3B are diagrams each for explaining a picked-up image represented by an image signal. FIG. 3A shows an image obtained by picking up an image of a moving object OBf that corresponds to the moving foreground and an image of an object OBb that corresponds to the still background. It is to be noted that the moving object OBf that corresponds to the foreground is supposed to be moving horizontally in a direction of an arrow, A.

FIG. 3B shows a relationship between the image and time at a position on line L, which is indicated by broken lines, extending in the direction of arrow A as shown in FIG. 3A. If a length of the moving object OBf in its motion direction on the line L is, for example, nine pixels and the moving object OBf moves as much as five pixels in one period of exposure time, its front end that has stayed at pixel position P21 and its rear end that has stayed at pixel position P13, at the beginning of a period of frame period, respectively move to pixel positions P25 and P17 at the end of the period of exposure time. Further, if the shutter is not operated, a period of exposure time for one frame is equal to one period of frame time, so that the front end moves to pixel position P26 and the rear end moves to pixel position P18, at the beginning of the next period of frame time.

Accordingly, in the period of frame time on the line L, a portion up to pixel position P12 and a portion from pixel position P26 each provide a background region that is constituted of a background component only. A portion between the pixels positions P17 and P21 provides a foreground region constituted of a foreground component only. A portion between the pixel positions P13 and P16 and a portion between the pixel positions P22 and P25 each provide a mixed region in which a foreground component and a background component are mixed. The mixed regions are classified into a covered background region in which a background component is covered by a foreground as time elapses and an uncovered background region in which a background component appears as time elapses. It is to be noted that in FIG. 3B, a mixed region positioned on the front end side of the foreground object OBf in its traveling direction provides a covered background region and a mixed region positioned on its rear end side in its traveling direction provides an uncovered background region. Thus, an image signal contains an image that includes a foreground region, background regions, or a covered background region or an uncovered background region.

Figure 4:
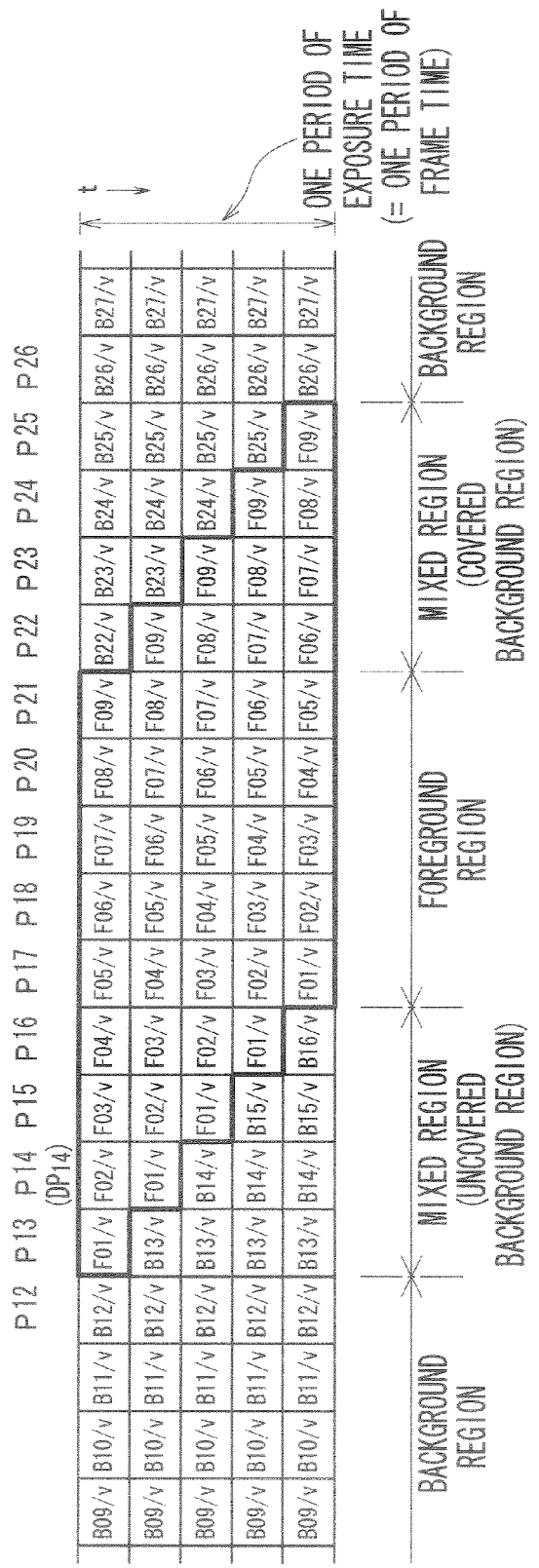
FIG. 4 is a diagram for showing operations for dividing pixel values in a time direction.

Herein, on the assumption that an image time interval is short and hat the moving object OBf that corresponds to the foreground is a rigid body and moves with uniform speed, operations for dividing pixel values on the line L time-directionally are performed as shown in FIG. 4. In these operations for time-directional division, a pixel value as developed in the time direction and divided by a virtual divisor into equal time intervals. It is to be noted that in FIG. 4, a vertical axis represents time, to indicate that time elapses downward in the figure.

The virtual divisor is set to one corresponding to a motion amount v or the like of a moving object that corresponds to the foreground in an image time interval. For example, if the motion amount v in one period of frame time corresponds to five pixels as described above, the virtual divisor is set to "5" corresponding to the motion amount v, to divide one period of frame time into five equal time intervals.

Further, pixel values, during one period of frame time, of pixel position Px obtained when the object OBb that corresponds to the background is picked up are supposed to be Bx and pixel values obtained at the pixels when the moving object OBf having a nine-pixel length on the line L, which corresponds to the foreground, is picked up with it being at rest are supposed to be F09 (on the front end side) through F01 (on the rear end side).

In this case, for example, pixel value DP14 at pixel position P14 is given by Equation 1:

$$DP14 = B14/v + B14/v + B14/v + F01/v + F02/v \quad (1)$$

At this pixel position P14, three virtual time dividends (a period of frame time/v) of the background component and two virtual time dividends of the foreground component are contained and so, a mixture ratio α of the background component with respect to the pixel value is 3/5. Similarly, for example, at pixel position P22, one virtual time dividend of the background component and four virtual time dividends of the foreground component are contained and so, a mixture ratio α therewith is 1/5.

Thus, elements of the foreground are moved so that in one period of exposure time, elements of the different foregrounds are added, and therefore, region of the foreground that corresponds to the moving object contains a motion blur. Accordingly, in the image-processing apparatus 20, significant information embedded in the image signal DVa is extracted and so, the image signal DVout from which a motion blur of the moving object OBf corresponding to the foreground is removed is generated.

Herein, the following will describe operations of calculating a pixel value of a target pixel on an image with reference to FIG. 5A, For example, in the case of obtaining a pixel value F29 of a target pixel in the moving object OBf, Equation 2 holds true, with taking a pixel position P47 containing the element F29/v of the target pixel into consideration as a pixel of interest that is to be processed, on a pixel position P45 where an element F29/v of the target pixel appears first and a pixel position P44 which is adjacent to the pixel position P45 and does not have the element F29/v of the target pixel, as indicated by broken lines.

$$F29-F24=(DP45-DP44)\times v \qquad (2)$$

Similarly, Equation 3 holds true on a pixel position P49 where an element F29/v of the target pixel appears last and a pixel position P50 which is adjacent to the pixel position P49 and does not have the element F29/v of the target pixel as indicated by broken lines.

$$F34-F29=(DP50-DP49)\times v \qquad (3)$$

Namely, the pixel value F29 of the target pixel can be calculated by using the pixel values DP44, DP45 of the pixel positions P44, P45 and pixel value F24 or the pixel values DP49, DP50 of the pixel positions P49, P50 and pixel value F34.

Further, with taking into consideration that the pixel value F24 can be also calculated similar to that of the pixel value F29 of the target pixel, Equation 4 holds true on a pixel position P40 where an element F24/v appears first and a pixel position P39 which is adjacent to the pixel position P40 and does not have the element F24/v, as indicated by broken lines.

$$F24-F19=(DP40-DP39)\times v \qquad (4)$$

Thus, the pixel value F24 can be further calculated by using pixel values DP39, DP40, DP44, and DP45 of the pixel positions P39, P40, P44, and P45, and pixel value F19. Similarly, the pixel value F34 can be also calculated.

Based on the results above, positions of pixels, difference of which is to be obtained, repeatedly appear with an interval of the motion amount. In other words, the pixel value F29 of the target pixel can be calculated by using the pixel values of the pixel positions, difference of which is to be calculated, P39, P40, P44, P45, P49, P50 and so on.

Figure 6:
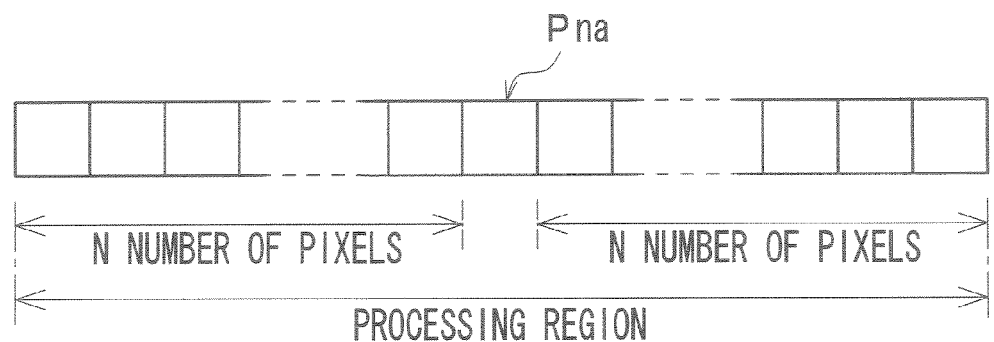
FIG. 6 is a diagram for showing a processing region.
Figure 7A:
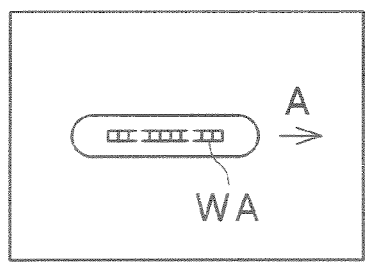
FIGS. 7A and 7A are illustrations each for illustrating an example of setting the processing region.
Figure 7B:
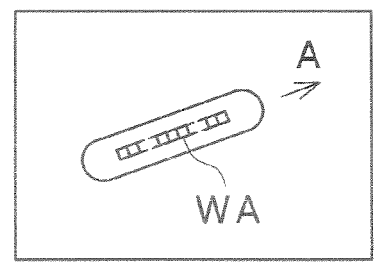

The following describe a case of calculating a pixel value of a target pixel by using model equations. Herein, as shown in FIG. 6, a processing region of (2N+1) number of pixels is set in a motion direction as a center of a target pixel Pna. FIGS. 7A and 7B show setting examples of processing regions, in which a processing region WA is set horizontally as shown in FIG. 7A when a direction of a motion vector is, for example, horizontal as indicated by an arrow A with respect to a pixel of a moving object OBf whose motion blurs are to be removed. When a direction of a motion vector is oblique, as shown in FIG. 7B, a processing region WA is set in a corresponding angle. However, when setting the processing region obliquely, a pixel value that corresponds to a pixel position in the processing region is obtained by interpolation etc.

Figure 8:
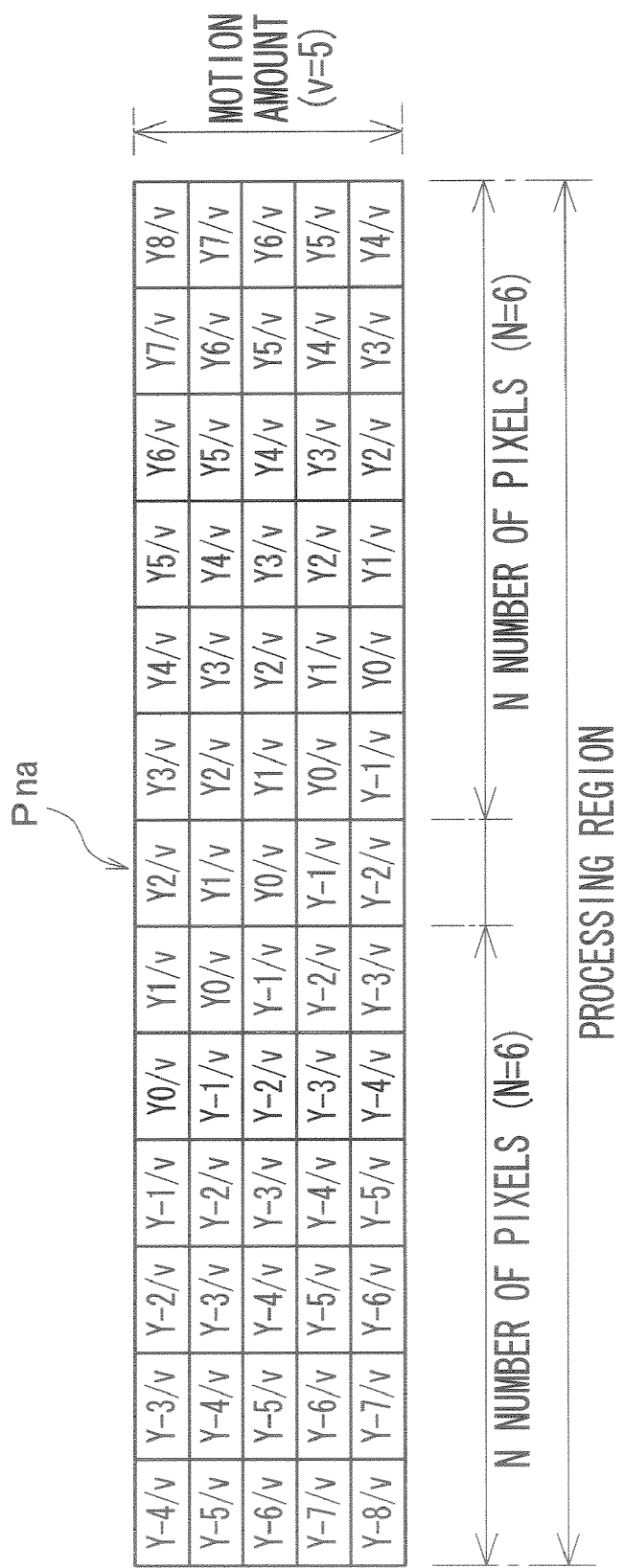
FIG. 8 is a chart for explaining time-wise mixture of real world variables in the processing region.

Herein, in the processing region, as shown in FIG. 8, real world variables ($Y_{-8}, \ldots, Y_0, \ldots, Y_8$) are mixed time-wise. It is to be noted that FIG. 8 shows a case where a motion amount v is set to "v=5" and the processing region is made up of 13 pixels (N=6, where N is the number of pixels in a width of processing for the target pixel).

In blur-removing processing, a real world is estimated on the processing region, pixel value DQ0 corresponding to a central pixel variable $Y_0$ of the estimated real world is set as a pixel value of a target pixel whose motion blurs have been removed.

If the pixel values of the pixels constituting the processing region are represented by $X_{-N}, X_{-N+1}, \ldots, X_0, \ldots, X_{N-1}, X_N$, (2N+1) number of mixture equations such as ones indicated in Equation 5 are established. It is to be noted that pixel values Xt indicate pixel values of pixel positions Pt. Constant h indicates a value of an integral portion in motion amount v multiplied by ½, that is, a value obtained by discarding its decimal places.

$$\sum_{i=t-h}^{t+h}(Yi/v)=Xt \qquad (5)$$

(where $t=-N, \ldots, 0, \ldots, N$)

However, there are (2N+v) number of real world variables ($Y_{-N-h}, \ldots, Y_0, \ldots, Y_{N+h}$) to be obtained. In other words, the equations are outnumbered by the variables, so that it is impossible to obtain the real world variables ($Y_{-N-h}, \ldots, Y_0, \ldots, Y_{N+h}$) based on the Equation 5.

Therefore, by using Equation 6, which is a constraint equation employing a space correlation of inter-adjacent pixel difference=0, the number of the equations is increased than the real world variables, to obtain values of the real world variables by the least-squares method.

$$Y_t-Y_{t+1}=0 \text{ (where } t=-N-h, \ldots, 0, \ldots, N+h-1) \qquad (6)$$

In other words, by using (4N+v) number of equations including the (2N+1) number of mixture equations represented by the Equation 5 and the (2N+v−1) number of constraint equations represented by the Equation 6, the (2N+v) number of real world variables ($Y_{-N-h}, \ldots, Y_0, \ldots, Y_{N+h}$), which are unknown variables, are obtained.

Herein, by performing such estimation as to minimize a sum of squares of errors that occur in the equations, it is possible to suppress fluctuations in the pixel values in the real world with performing processing to generate an image from which motion blur is removed.

Equation 7 indicates a case where the processing region is set as shown FIG. 8, in which errors that occur in the respective Equations 5 and 6 are added to them.

$$\begin{bmatrix} 1/v & 1/v & 1/v & 1/v & 1/v & 0 & 0 & 0 & 0 & 0 & 0 & 0 & 0 & 0 & 0 & 0 & 0 \\ 0 & 1/v & 1/v & 1/v & 1/v & 1/v & 0 & 0 & 0 & 0 & 0 & 0 & 0 & 0 & 0 & 0 & 0 \\ 0 & 0 & 1/v & 1/v & 1/v & 1/v & 1/v & 0 & 0 & 0 & 0 & 0 & 0 & 0 & 0 & 0 & 0 \\ 0 & 0 & 0 & 1/v & 1/v & 1/v & 1/v & 1/v & 0 & 0 & 0 & 0 & 0 & 0 & 0 & 0 & 0 \\ 0 & 0 & 0 & 0 & 1/v & 1/v & 1/v & 1/v & 1/v & 0 & 0 & 0 & 0 & 0 & 0 & 0 & 0 \\ 0 & 0 & 0 & 0 & 0 & 1/v & 1/v & 1/v & 1/v & 1/v & 0 & 0 & 0 & 0 & 0 & 0 & 0 \\ 0 & 0 & 0 & 0 & 0 & 0 & 1/v & 1/v & 1/v & 1/v & 1/v & 0 & 0 & 0 & 0 & 0 & 0 \\ 0 & 0 & 0 & 0 & 0 & 0 & 0 & 1/v & 1/v & 1/v & 1/v & 1/v & 0 & 0 & 0 & 0 & 0 \\ 0 & 0 & 0 & 0 & 0 & 0 & 0 & 0 & 1/v & 1/v & 1/v & 1/v & 1/v & 0 & 0 & 0 & 0 \\ 0 & 0 & 0 & 0 & 0 & 0 & 0 & 0 & 0 & 1/v & 1/v & 1/v & 1/v & 1/v & 0 & 0 & 0 \\ 0 & 0 & 0 & 0 & 0 & 0 & 0 & 0 & 0 & 0 & 1/v & 1/v & 1/v & 1/v & 1/v & 0 & 0 \\ 0 & 0 & 0 & 0 & 0 & 0 & 0 & 0 & 0 & 0 & 0 & 1/v & 1/v & 1/v & 1/v & 1/v & 0 \\ 0 & 0 & 0 & 0 & 0 & 0 & 0 & 0 & 0 & 0 & 0 & 0 & 1/v & 1/v & 1/v & 1/v & 1/v \\ \hline 1 & -1 & 0 & 0 & 0 & 0 & 0 & 0 & 0 & 0 & 0 & 0 & 0 & 0 & 0 & 0 & 0 \\ 0 & 1 & -1 & 0 & 0 & 0 & 0 & 0 & 0 & 0 & 0 & 0 & 0 & 0 & 0 & 0 & 0 \\ 0 & 0 & 1 & -1 & 0 & 0 & 0 & 0 & 0 & 0 & 0 & 0 & 0 & 0 & 0 & 0 & 0 \\ 0 & 0 & 0 & 1 & -1 & 0 & 0 & 0 & 0 & 0 & 0 & 0 & 0 & 0 & 0 & 0 & 0 \\ 0 & 0 & 0 & 0 & 1 & -1 & 0 & 0 & 0 & 0 & 0 & 0 & 0 & 0 & 0 & 0 & 0 \\ 0 & 0 & 0 & 0 & 0 & 1 & -1 & 0 & 0 & 0 & 0 & 0 & 0 & 0 & 0 & 0 & 0 \\ 0 & 0 & 0 & 0 & 0 & 0 & 1 & -1 & 0 & 0 & 0 & 0 & 0 & 0 & 0 & 0 & 0 \\ 0 & 0 & 0 & 0 & 0 & 0 & 0 & 1 & -1 & 0 & 0 & 0 & 0 & 0 & 0 & 0 & 0 \\ 0 & 0 & 0 & 0 & 0 & 0 & 0 & 0 & 1 & -1 & 0 & 0 & 0 & 0 & 0 & 0 & 0 \\ 0 & 0 & 0 & 0 & 0 & 0 & 0 & 0 & 0 & 1 & -1 & 0 & 0 & 0 & 0 & 0 & 0 \\ 0 & 0 & 0 & 0 & 0 & 0 & 0 & 0 & 0 & 0 & 1 & -1 & 0 & 0 & 0 & 0 & 0 \\ 0 & 0 & 0 & 0 & 0 & 0 & 0 & 0 & 0 & 0 & 0 & 1 & -1 & 0 & 0 & 0 & 0 \\ 0 & 0 & 0 & 0 & 0 & 0 & 0 & 0 & 0 & 0 & 0 & 0 & 1 & -1 & 0 & 0 & 0 \\ 0 & 0 & 0 & 0 & 0 & 0 & 0 & 0 & 0 & 0 & 0 & 0 & 0 & 1 & -1 & 0 & 0 \\ 0 & 0 & 0 & 0 & 0 & 0 & 0 & 0 & 0 & 0 & 0 & 0 & 0 & 0 & 1 & -1 & 0 \\ 0 & 0 & 0 & 0 & 0 & 0 & 0 & 0 & 0 & 0 & 0 & 0 & 0 & 0 & 0 & 1 & -1 \end{bmatrix} \begin{bmatrix} Y_{-8} \\ Y_{-7} \\ Y_{-6} \\ Y_{-5} \\ Y_{-4} \\ Y_{-3} \\ Y_{-2} \\ Y_{-1} \\ Y_0 \\ Y_1 \\ Y_2 \\ Y_3 \\ Y_4 \\ Y_5 \\ Y_6 \\ Y_7 \\ Y_8 \end{bmatrix} = \begin{bmatrix} X_{-6} \\ X_{-5} \\ X_{-4} \\ X_{-3} \\ X_{-2} \\ X_{-1} \\ X_0 \\ X_1 \\ X_2 \\ X_3 \\ X_4 \\ X_5 \\ X_6 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \end{bmatrix} + \begin{bmatrix} e_{m_{-6}} \\ e_{m_{-5}} \\ e_{m_{-4}} \\ e_{m_{-3}} \\ e_{m_{-2}} \\ e_{m_{-1}} \\ e_{m_0} \\ e_{m_1} \\ e_{m_2} \\ e_{m_3} \\ e_{m_4} \\ e_{m_5} \\ e_{m_6} \\ e_{b_0} \\ e_{b_1} \\ e_{b_2} \\ e_{b_3} \\ e_{b_4} \\ e_{b_5} \\ e_{b_6} \\ e_{b_7} \\ e_{b_8} \\ e_{b_9} \\ e_{b_{10}} \\ e_{b_{11}} \\ e_{b_{12}} \\ e_{b_{13}} \\ e_{b_{14}} \\ e_{b_{15}} \end{bmatrix} \quad (7)$$

This Equation 7 can be expressed as Equation 8 and such $Y (=Y_i)$ as to minimize a sum of squares E of errors indicated in Equation 9 is obtained as Equation 10. It is to be noted that T in the Equation 10 stands for a transposed matrix.

$$AY = X + e \quad (8)$$

$$E = |e|^2 = \sum emi^2 + \sum ebi^2 \quad (9)$$

$$Y = (A^T A)^{-1} A^T X \quad (10)$$

Herein, a sum of squares of errors is indicated by Equation 11, so that by partially differentiating the sum of squares of the errors in order to provide a partial differential value of 0 as indicated by Equation 12, the Equation 10 that minimizes the sum of squares of the errors can be obtained.

$$E = (AY - X)^T (AY - X) \quad (11)$$
$$= Y^T A^T A Y - 2Y^T A^T X + X^T X$$

$$\partial E / \partial Y = 2(A^T A Y - A^T X) = 0 \quad (12)$$

By performing linear combination on this Equation 10, the real world variables $(Y_{-N-h}, \ldots, Y_0, \ldots, Y_{N+h})$ can be respectively obtained so that a pixel value of the central pixel variable $Y_0$ can be set as a pixel value of the target pixel.

Although the above example has obtained the real world variables $(Y_{-N-h}, \ldots, Y_0, \ldots, Y_{N+h})$ by the least-squares method so that a sum of squares E of errors in AY=X+e may be minimized, it is also possible to make the equations in such a manner that the number of the equations may be equal to the number of the variables. By assuming this equation to be AY=X and modifying it into $Y=A^{-1}X$, the real world variables $(Y_{-N-h}, \ldots, Y_0, \ldots, Y_{N+h})$ can be obtained.

Herein, if obtaining the pixel value F29 with setting the pixel position P47 shown in FIG. 5A as a target pixel, a processing coefficient to be used at each of the pixels indicates a shape shown in FIG. 5B. In other words, an absolute value of the processing coefficient for the pixel of each pixel position used for calculation of difference thereof increases more than that of processing coefficient for other pixels. Such the pixel of each pixel position used for calculation of difference provides the main term.

Figure 9:
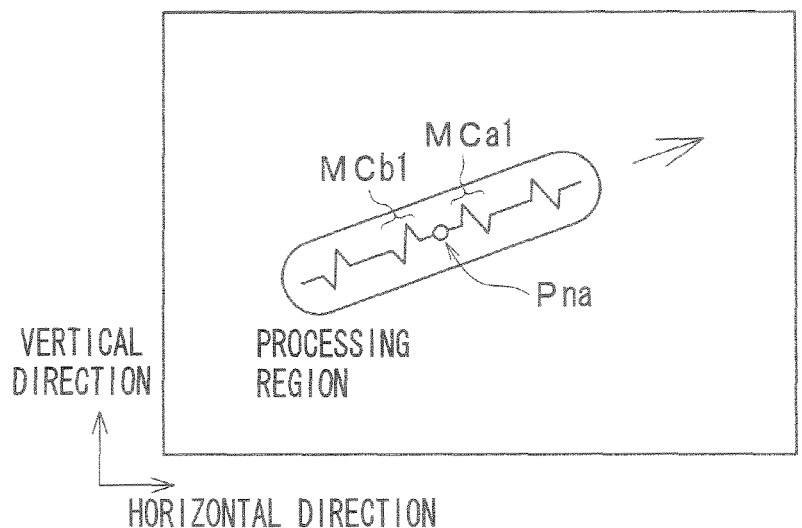
FIG. 9 is a diagram for illustrating positions of main terms in a space direction.

Space directional locations of the main terms become pixel positions that correspond to a motion amount in a motion direction with reference to the target pixel Pna, as shown in FIG. 9. It is to be noted that a main term MCa1 is closest to the target pixel Pna in the moving direction and a main term MCb1 is closest to it in a direction opposite to the motion direction.

Figure 10:
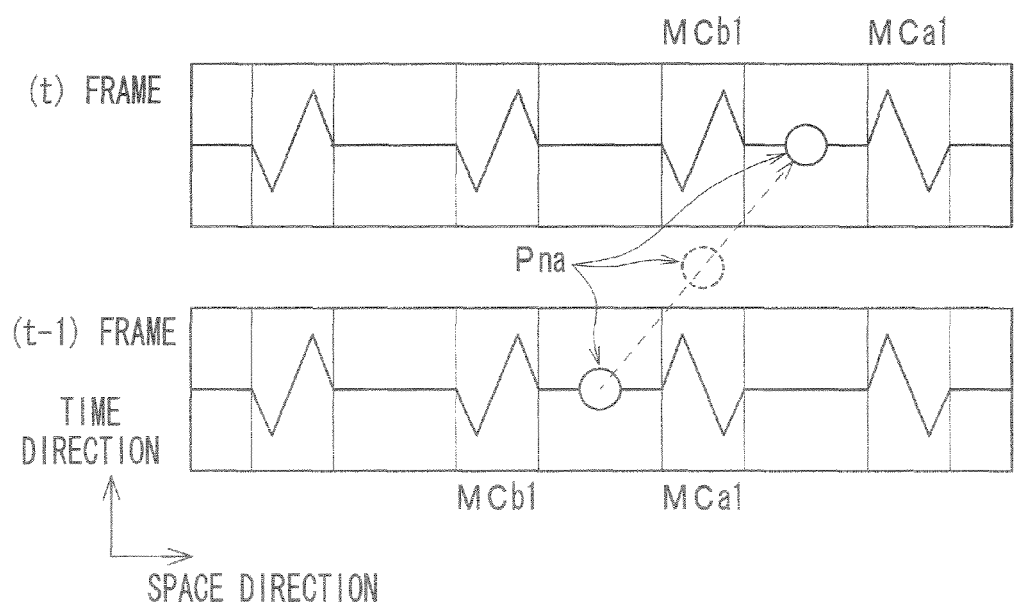
FIG. 10 is a diagram for illustrating positions of main terms in a time direction.

Time directional positions of the main terms appear at the same pixel position on plural images as shown in FIG. 10. Further, with paying attention to the above-mentioned main terms MCa1 and MCb1, the position of the main term MCa1 on an image of the (t−1) frame agrees with that of the main term MCb1 on an image of the (t) frame. Therefore, a pixel position which has a phase at the center of the (t−1) and (t) frames and at which both of the main terms MCa1 and MCb1 are almost located corresponds to the target pixel Pna. Exactly, the main term MCa1 corresponds to in the pixels of pixel values $X_{-3}$, $X_{-2}$, and the rain term KMCb1 corresponds to the pixels of pixel values $X_2$, and $X_3$ so that the special position of the target pixel Pna corresponds to a middle position between the pixel of the pixel value $X_{-3}$ and the pixel of the pixel value $X_{-2}$, or a riddle position between the pixel of the pixel value $X_3$ and the pixel of the pixel value $X_2$.

Figure 11A:
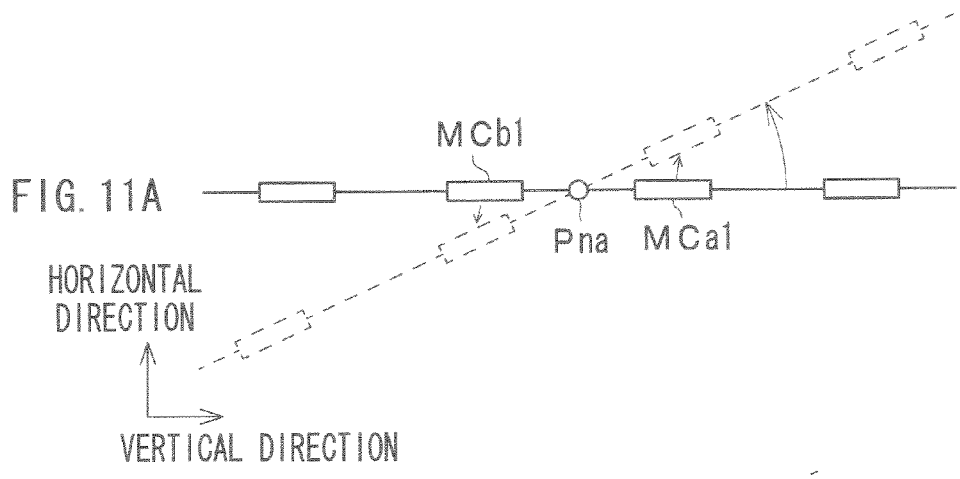
FIGS. 11A and 11B are diagrams each for explaining a relationship between shift of the motion vector and shift in positions of the main terms in a case where the main terms are used in the space direction.

Herein, as shown in FIG. 11A, if by using only main terms in a space direction, a pixel position that is located at a middle position between the main terminals MCa1 and MCb1, which are present in the space direction, is set as an output position of the motion-blur-removed target pixel Pna, positions of the main terminals Mca1 and MCb1 and the like are fluctuated on a large scale, as shown in broken lines, when motion vector of the target pixel Pna cannot be accurately detected, so that it is impossible to remove the motion blur of the target pixel Pna accurately.

Figure 11B:
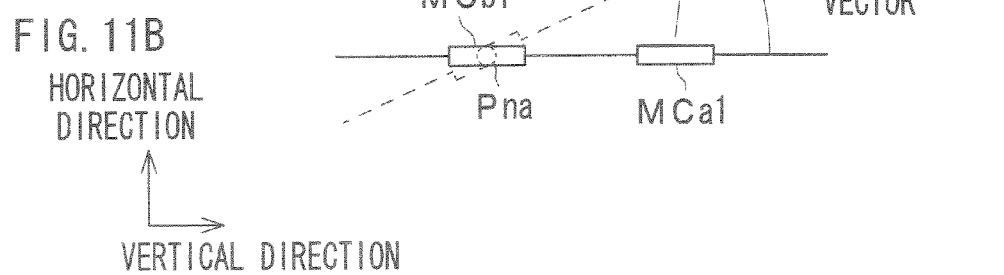

As shown in FIG. 11B also, if by using only main terms in a space direction, a pixel position that is located at a middle position between the frames is set as an output phase of the motion-blur-removed target pixel Pna, position of the main terminal MCb1 has a slight influence on detection accuracy of the motion vector but positions of the remaining main term MCa1 and the like have a serious influence on the detection accuracy of the motion vector, as shown in broken lines, so that when motion vector of the target pixel Pna cannot be accurately detected, it is impossible to remove the motion blur of the target pixel Pna accurately.

Further, if by using main terms in a time direction, a pixel position that is located at a middle position between the main terminals MCa1 and MCb1 is set as an output position of the motion-blur-removed target pixel Pna as the case of FIG. 11A, positions of the main terminals are fluctuated in the time direction when motion vector of the target pixel Pna cannot be accurately detected, so that it is impossible to remove the motion blur accurately.

Figure 12:
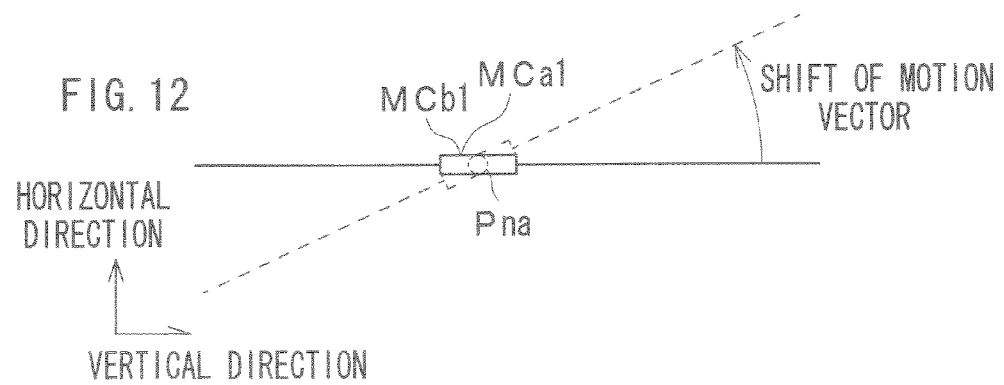
FIG. 12 is a diagram for explaining a relationship between shift of the motion vector and shift in positions of the main terms in a case where the main terms are used in the time direction.

Thus, as shown FIG. 12, by using main terms in a time direction, the middle between the frames is set as an output phase of the motion-blur-removed target pixel Pna to generate a motion-blur-removed pixel value of the target pixel Pna. In other words, by using the main term MCa1 on the image of (t−1) frame and the main term MCb1 on the image of (t) frame as shown in FIG. 10, a pixel that is located at a middle phase between the (t−1) frame and the (t) frame and has the almost same space position as those of the main terms MCa1 and MCb1 is set as the target pixel Pna of the target image to generate a motion-blur-removed pixel value thereof. Thus, if an output phase of the motion-blur-removed target pixel Pna is set as the middle between the frames of (t−1) and (t) frames, positions of main terms in the time direction have a slight influence on detection accuracy of the motion vector, so that positions of main terms can be not fluctuated on a large scale even if the motion vector cannot be accurately detected, thereby enabling the motion blur to be satisfactorily removed without having any serious influence on detection accuracy of the motion vector.

Shapes of the processing coefficients of the main terms of the (t−1) frame and (t) frame indicate those of the coefficients of plural pixels, i.e., plural pairs of coefficients, which have replaced their positive and negative to each other in the time direction with respect to the position of the target pixel Pna, as clearly shown in FIG. 10. Accordingly, in a case of a still background that has the almost same pixel value between the pixel values in advance and afterward in the time direction and has a strong space correlation with each other, large processing coefficients in advance and afterward are eliminated from each other, so that as a result thereof, this is identical to a case where small processing coefficients are allocated. Therefore, it is possible to hard for any failure in the image to occur even if motion blur removing used for an object having a large motion amount is performed on a still background or the like. If there is, however, a serious error in the detected motion vector, a failure could occur, so that in the learning of processing coefficients, which will be described later, any robust property against the failure of a still image is improved.

Figure 13:
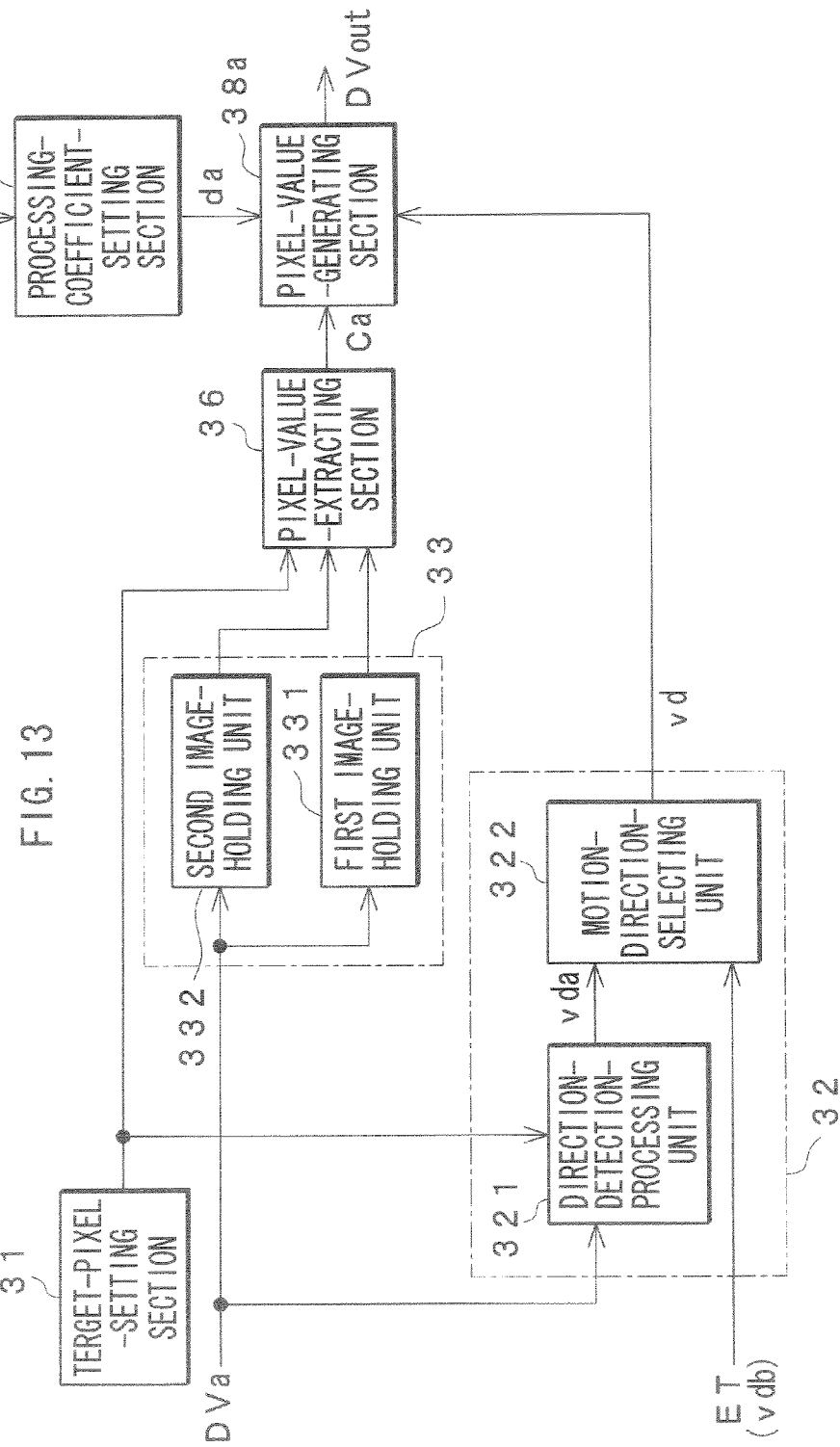
FIG. 13 is a functional block diagram of an image-processing apparatus.

FIG. 13 shows a functional diagram of the image-processing apparatus that uses the main terms in time and space directions and performs motion blur removing by setting the middle between the frames as an output phase of the motion-blur-removed target pixel Pna. It is to be noted that functions of the image-processing apparatus may be realized by hardware or software. In other words, the function blocks of FIG. 13 may be realized by either hardware or software.

Figure 14:
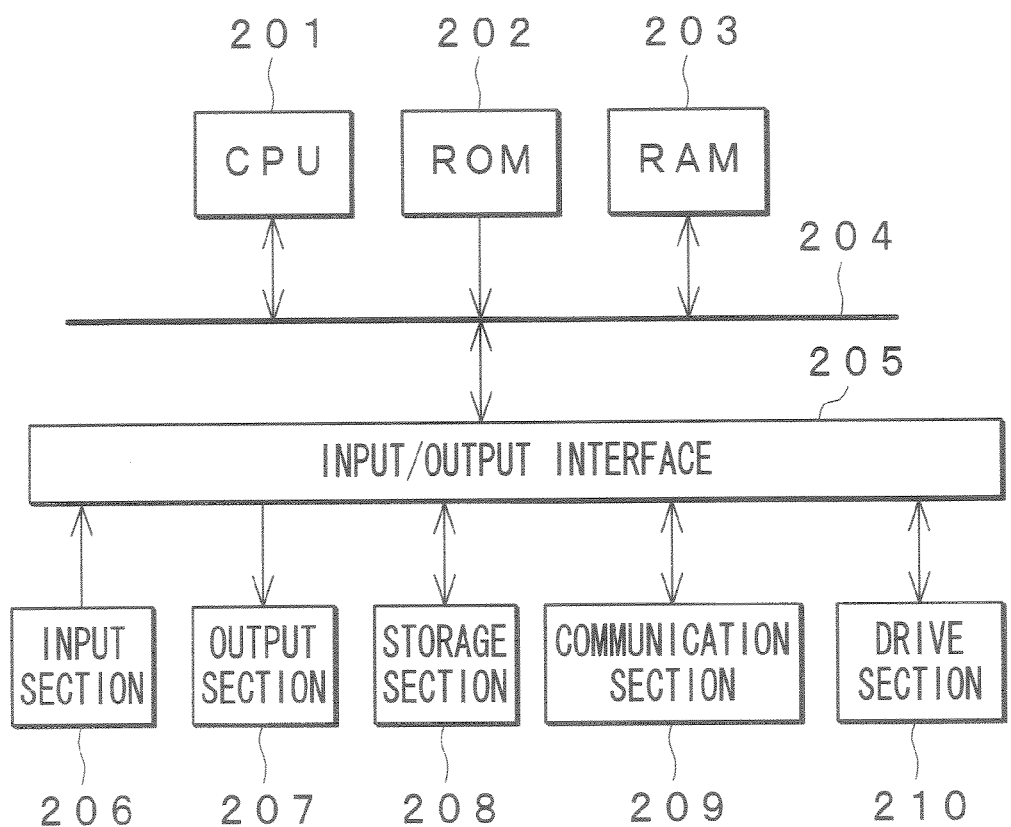
FIG. 14 is a diagram for showing a configuration of the image-processing apparatus in a case where software is used.

A configuration of the image-processing apparatus 20 in use of the software is show in, for example, FIG. 14. A central processing unit (CPU) 201 performs various kinds of processing in accordance with programs stored in a read only memory (ROM) 202 or a storage section 208, and the programs to realize the functions of the image-processing apparatus are stored in the ROM 202 and/or the storage section 208. A random access memory (RAM) 203 appropriately stores a program or data which is executed by the CPU 201. The CPU 201, the ROM 202, and the RAM 203 are connected to each other via a bus 204.

To the CPU 201, an input/output interface 205 is connected via the bus 204. An input section 206 constituted of a keyboard, a mouse, or a microphone and an output section 207 constituted of a display or a speaker are connected to the input/output interface 205. The CPU 201 performs various kinds of processing in accordance with commands input from the input section 206. Then, the CPU 201 provides the output section 207 with an image, an audio, etc. obtained as a result of the processing.

The storage section 208 connected to the input/output interface 205 is constituted of, for example, a hard disk, to store programs and various kinds of data to be run by the CPU 201. A communication section 209 communicates with an external apparatus via the Internet or any other networks. In this example, the communication section 209 serves as an acquisition section that takes in an output of the sensor. It may also acquire programs via the communication section 209 and store them in the storage section 208.

A drive section 210 connected to the input/output interface 205, if mounted with a storage medium such as a magnetic disk, an optical disk, a magnetic optical disk, or a semiconductor memory, drives them to acquire program or data stored in the storage medium. The acquired programs and data are transferred to the storage section 208 and stored in it as necessary.

As shown in FIG. 13, an image signal DVa that has been supplied to the image-processing apparatus 20 is supplied to a direction-detection-processing unit 321 of a motion-direction-detecting section 32, and a first image-holding unit 331 and a second image-holding unit 332 of a peripheral-image-holding section 33, respectively.

A target-pixel-setting section 31 sets a target pixel Pna in a target image to be predicted. Herein, as described by using the above-mentioned FIGS. 10, 12, by using the main term MCa1 on the image of (t−1) frame and the main term MCb1 on the image of (t) frame, it is possible to obtain the motion-blur-removed pixel value of the target pixel Pna, which is a pixel that has at a middle phase between the (t−1) frame and the (t) frame and is located at the almost same pixel position as those of the main terms MCa1 and MCb1. Thus, when the image signal DVa is a signal having a progressive format, the target-pixel-setting section 31 sets the target pixel Pna in a target image with the target image to be predicted being set as an image having a phase at the middle of the (t−1) frame and (t) frame. Further, images of the (t−1) frame and (t) frame are set as peripheral images. When the image signal DVa is a signal having an interlace format, the target-pixel-setting section 31 sets the target pixel Pna in a target image with the target image to be predicted being set as an image having a phase at the middle of the (t−1) field and (t) field. Further, images of the (t−1) field and (t) field are set as peripheral images.

The direction-detection-processing unit 321 detects a motion vector for each pixel based on the image signal DVa and supplies a motion-direction-selecting unit 322 with motion direction information vda indicative of a motion direction of target pixel set by the target-pixel-setting section 31. This direction-detection-processing unit 321 can use a method such as a block matching method or a gradient method to detect a motion vector for each pixel.

Into the motion-direction-selecting unit 322, motion direction information vdb indicative of the motion direction can be input as information ET from outside, and the motion-direction-selecting unit 322 selects any one from the motion direction information vda supplied from the direction-detection-processing unit 321 and the motion direction information vdb input from the outside to supply a pixel-value-generating section 38a with the selected motion direction information vd.

The first image-holding unit 331 and the second image-holding unit 332 of the peripheral-image-holding section 33 are constituted of memories and the first image-holding unit 331 holds an image of (t−1) frame that is a peripheral image. The second image-holding unit 332 also holds an image of (t) frame that is also a peripheral image.

A pixel-value-extracting section 36 extracts, in order to extract a rain term that mainly contains components of a target pixel, at least pixels whose space positions roughly agree with that of the target pixel Pna, from the peripheral images which are held in the first image-holding unit 331 and the second image-holding nit 332, and supplies them to a pixel-value-generating section 38a as prediction taps Ca.

Figure 15:
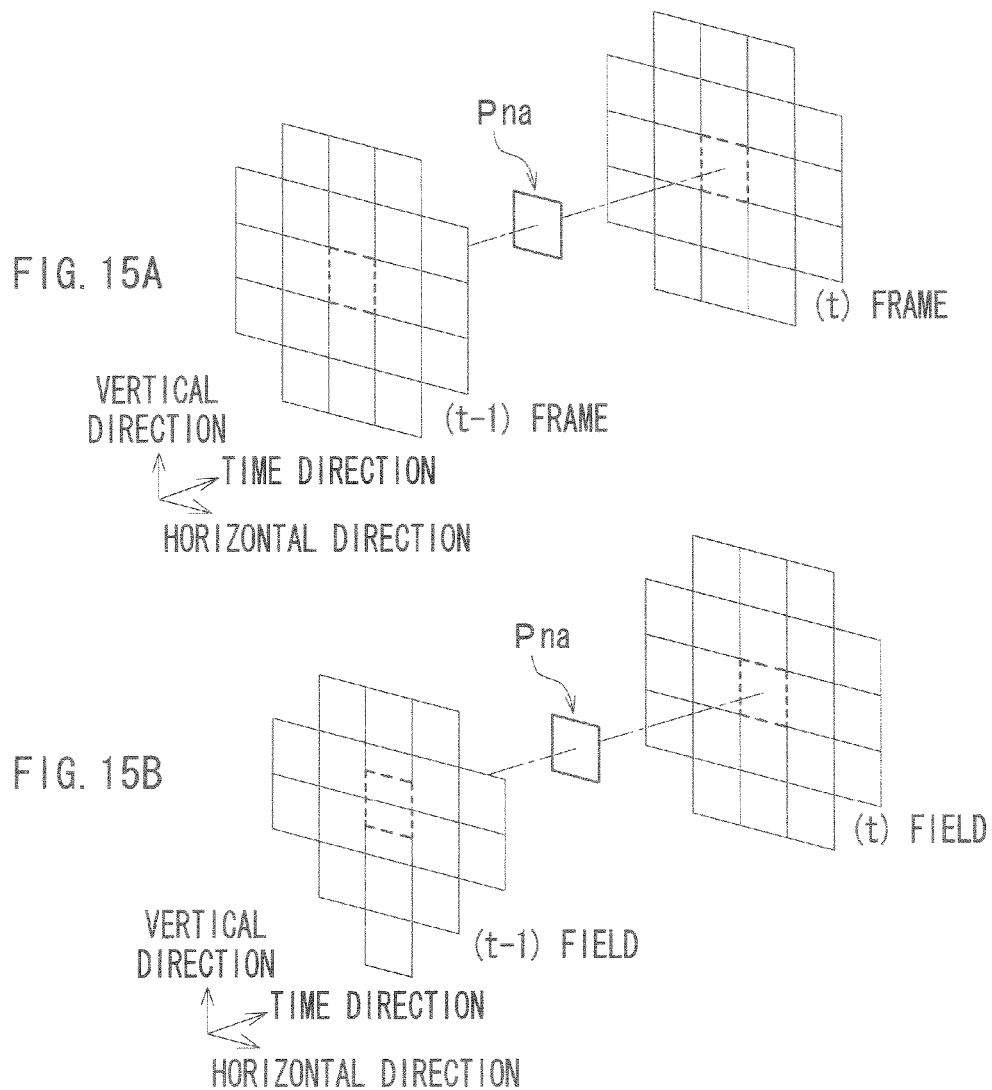
FIGS. 15A and 15B are diagrams each for showing prediction taps.

FIGS. 15A and 15B show the prediction taps Ca. If the image signal DVa has a progressive format, the pixel-value-extracting section 36 extracts from each of the images of (t−1) frame and (t) frame, which are the peripheral images, for example, a total of twenty-one pixels as each of the prediction taps based on pixels whose space positions roughly agree with that of the target pixel Pna, as shown in FIG. 15A, If the image signal DVa has an interlace format, the pixel-value-extracting section 36 extracts from the image of (t) field, which is the peripheral image, a total of twenty-one pixels as the prediction tap based on a pixel whose space position agrees with that of the target pixel Pna, as shown in FIG. 15B as well as it extracts from the image of (t−−1) field, which is the peripheral image, a total of seventeen pixels as the prediction tap based on a pixel whose space position agrees with that of the target pixel Pna.

The processing-coefficient-setting section 37a stores beforehand processing coefficients used for motion blur removing and supplies the pixel-value-generating section 38a with any plural pairs of processing coefficients da that correspond to the motion direction selected by the motion-direction-selecting unit. When receiving adjustment information BS that can adjust the motion blur as information ET from outside, the processing-coefficient-setting section 37a also switches the processing coefficients da to be supplied to the pixel-value-generating section 38a based on this adjustment information BS to adjust motion-blur-removing effects. For example, even if a motion-blur-removing cannot optimally be performed by means of processing coefficients supplied first, it is possible to remove the motion blur optimally by switching the processing coefficients to other. Further, by switching the processing coefficients, a motion blur can be left intentionally.

Based on the motion direction information vd selected in the motion-direction-selecting unit 322 the pixel-value-generating section 38a calculates pixel values in the on direction that corresponds to the processing coefficients da supplied from the processing-coefficient-setting section 37a, by using the pixel values of the pixels extracted from the first image-holding unit 331 in the pixel-value-extracting section 36. Further, it performs multiply and accumulation calculation of the calculated pixel values and the processing coefficients da supplied from the processing-coefficient-setting section 37a to generate a pixel value. It also calculates pixel values in the motion direction that corresponds to the processing coefficients da supplied from the processing-coefficient-setting section 37a, by using the pixel values of the pixels extracted from the second image-holding unit 332. Further, it performs multiply and accumulation calculation of the calculated pixel values and the processing coefficients da supplied from the processing-coefficient-setting section 37a to generate a pixel value. By integrating these two pixel values, a pixel value of the target pixel is generated and outputted as the image signal DVout.

Thus, by generating the pixel value of the target pixel in the target image by using the pixel values of the main terms of the plural peripheral images, any deterioration on performance for removing the motion blur can be mitigated even if the motion vector of the target pixel cannot be accurately detected, so that it is possible to perform very robust motion blur removing against any shifts in detection of motion vector.

Figure 16:
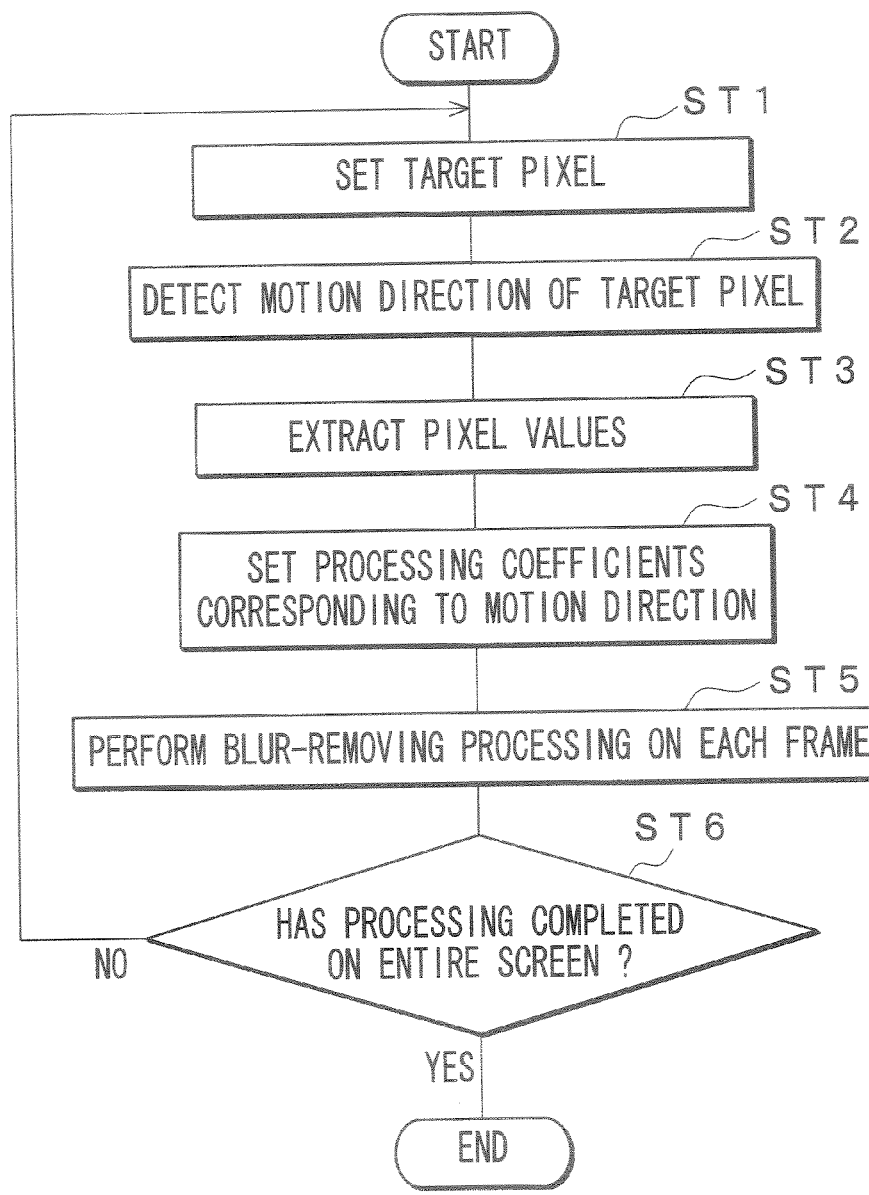
FIG. 16 is a flowchart for showing image processing.

FIG. 16 shows a flowchart in the case of performing image processing by using software. At step ST1, the CPU 201 sets a target pixel from which motion blur is to be removed, and proceeds to step ST2. At the step ST2, the CPU 201 detects a motion direction of the target pixel and proceeds to step ST3. At the step ST3, the CPU 201 performs extraction of the pixel values to extract pixel values of prediction taps set in peripheral images. In other words, in order to extract a main term that mainly contains components of a target pixel in a moving object, the CPU 201 sets pixels in peripheral images whose space positions roughly agree with that of the target pixel as at least the prediction taps and extracts the pixel values in these prediction taps.

At step ST4, the CPU 201 sets the processing coefficients corresponding to the motion direction detected at the step ST2 and proceeds to step ST5.

At the step ST5, the CPU 201 performs blur-removing processing on each of the frames. In other words, the CPU 201 calculates a blur-removed pixel value by performing any calculation processing on the pixel values in the prediction taps extracted in the step ST3 and the processing coefficients set at the step ST4, and proceeds to step ST6.

At the step ST6, the CPU 201 decides whether blur-removing processing has completed on entire screen and, if any one of the pixels is not undergone yet the blur-removing processing, it returns to the step ST1 while if blur removing has completed on the entire screen, it ends the processing.

By the way, although, in the image-processing apparatus 20 shown in FIG. 13, the processing coefficients have been set based on the motion direction selected in the motion-direction-selecting unit 322, it is possible to perform motion-blur-removing processing further accurately if a class determination is executed by using not only the motion direction but also signal level in the image and the processing coefficients are selected corresponding to the determined class and supplied to the pixel-value-generating section.

Figure 17:
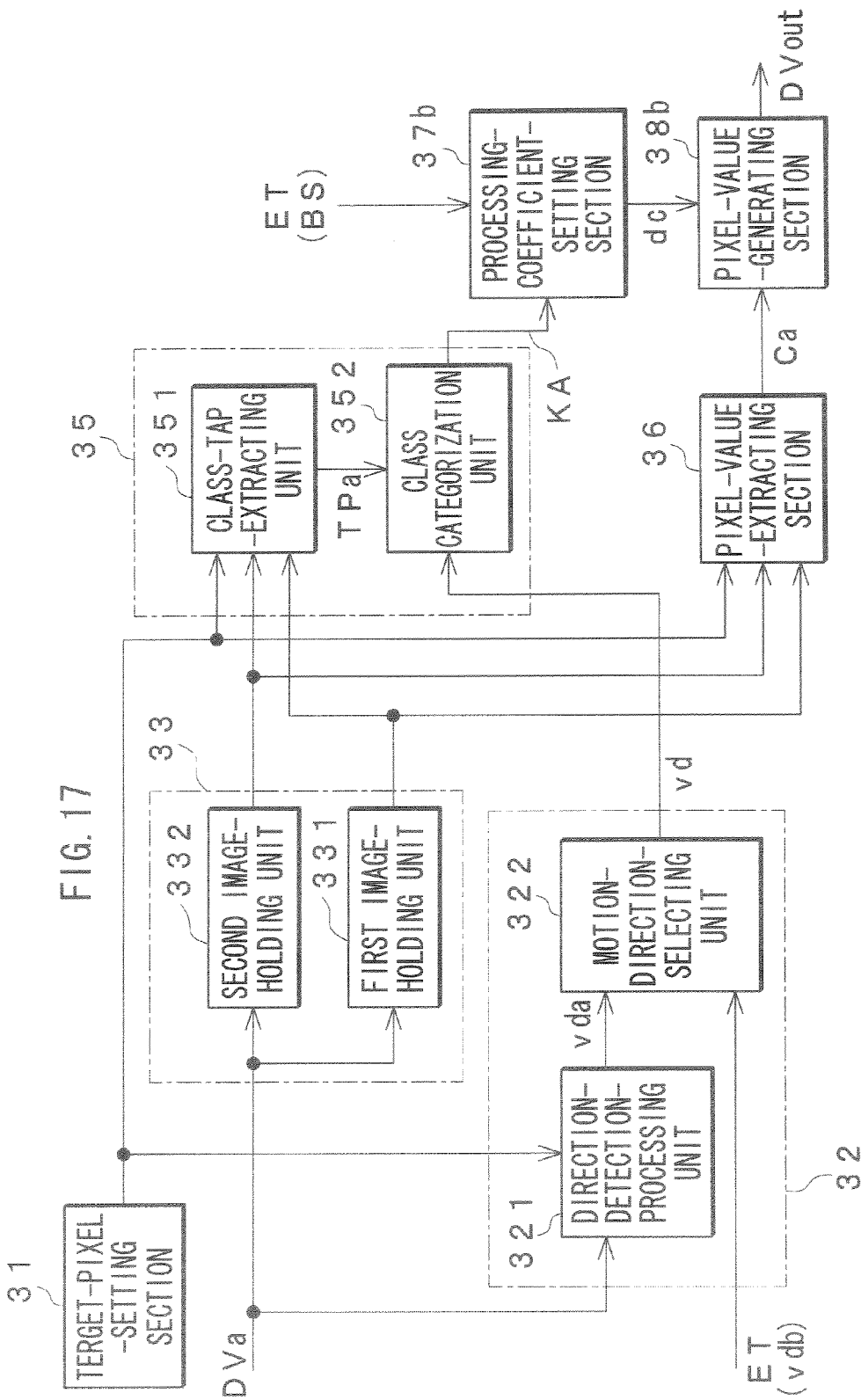
FIG. 17 is further functional block diagram of the image-processing apparatus (in a case where class determination is performed.

FIG. 17 is a functional block diagram of the image-processing apparatus in a case where class determination is performed. It is to be noted that components that correspond to those of FIG. 13 are indicated by the same symbols, detailed descriptions of which will be omitted.

A class-tap-extracting unit 351 of a class-determining section 35 extracts class taps from the peripheral images held on the first image-holding unit 331 and the second image-holding unit 332 based on their space positions corresponding to the target pixel, and supplies the extracted class taps TPa to a class categorization unit 352.

Figure 18A:
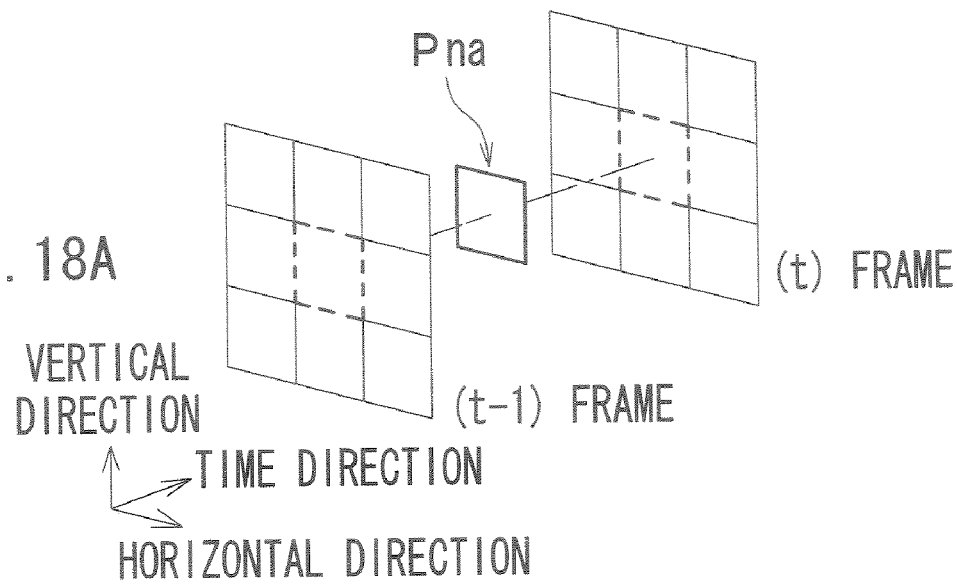
FIGS. 18A and 18B are diagrams each for showing class taps.
Figure 18B:
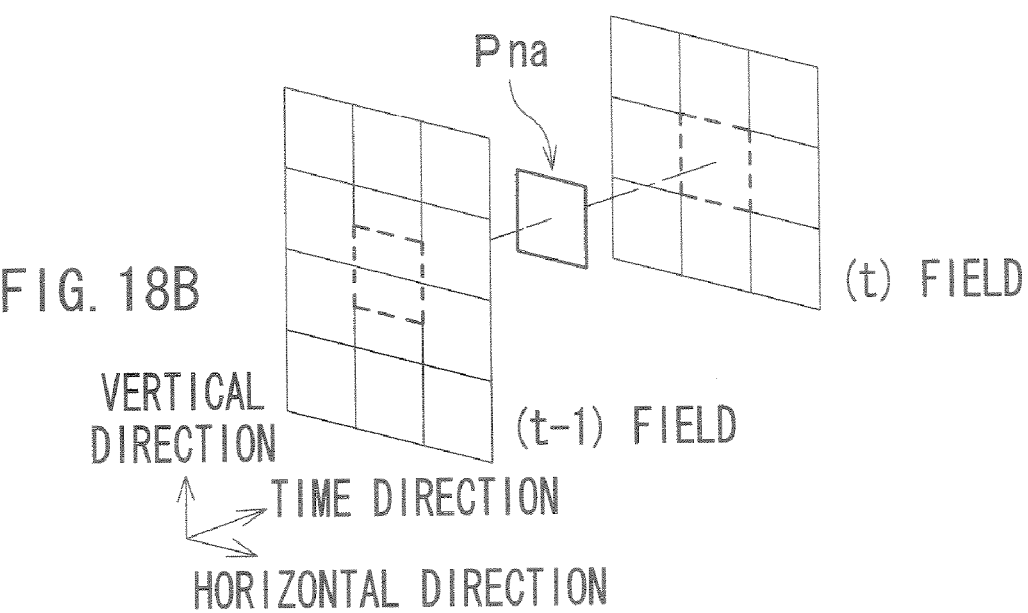

FIGS. 18A and 18B show the class taps. If the image signal DVa has a progressive format, the class-tap-extracting unit 351 extracts from each of the images of (t−1) frame and (t) frame, which are the peripheral images, for example, a total of nine pixels including a pixel at a space position corresponding to that of the target pixel Pna and adjacent pixels around this pixel as each of the class taps based on the space positions corresponding to the target pixel Pna as shown in FIG. 18A. If the image signal DVa has an interlace format, the class-tap-extracting unit 351 extracts from the image of (t) field, which is the peripheral image, for example, a total of nine pixels including a pixel at a space position corresponding to that of the target pixel Pna and adjacent pixels around this pixel as the class tap based on the space position corresponding to the target pixel Pna as shown in FIG. 18B. Further, it extracts from the image of (t−1) field, which is the peripheral image, for example, a total of twelve pixels including pixels that contain a space position corresponding to that of the target pixel Pna and adjacent pixels around these pixels as the class tap.

The class categorization unit 352 performs class categorization based on the motion direction information vd supplied from the motion-direction-detecting section 32 and the class taps TPa extracted by the class-tap-extracting unit 351 to determine a class code KA and supplies it to a processing-coefficient-setting section 37b.

Herein, if performing the class categorization using the class taps TPa extracted by the class-tap-extracting unit 351, the class categorization is performed based on an activity that is calculated from the class taps TPa.

Figures 19, 21:
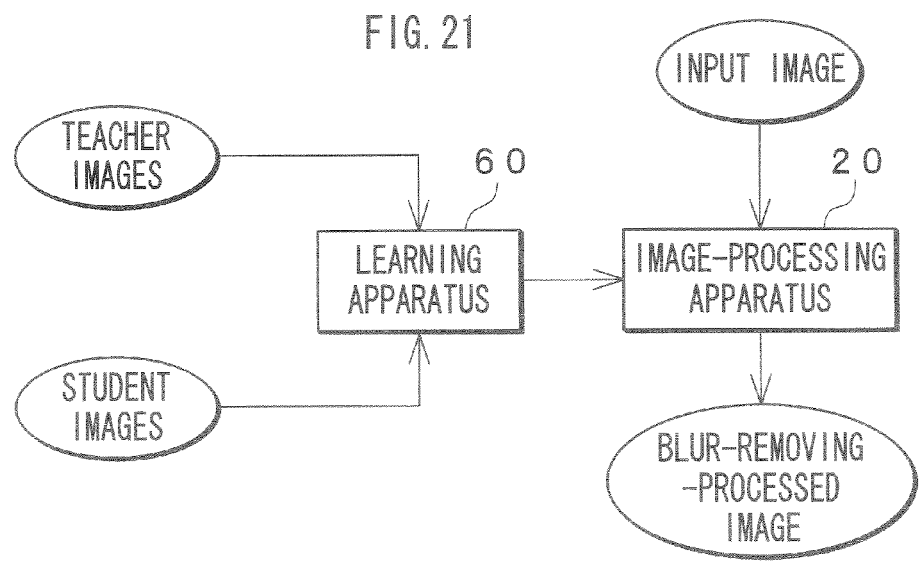
FIG. 19 is a diagram for explaining calculation of an activity.
FIG. 21 is a diagram for showing a configuration in a case where motion-blur-removing processing is performed by obtaining processing coefficients through learning.

The activity refers to as a sum of differences among pixels adjacent to each other, or indicates a space correlation therebetween. When selecting the class taps as shown in FIG. 18A, the activity is differences among total of nine pixels (3×3 pixels) adjacent to each other. Further, when selecting the class taps as (t−1) field shown in FIG. 18B, the activity is differences among total of twelve pixels (4×3 pixels) adjacent to each other. For example, if extracting the class tap as shown in FIG. 19, the activity AC can be calculated based on Equation 13 when character described in each cell indicating the pixel is set as the pixel value. It is to be noted that the higher a space correlation is, value of activity AC is small while the lower a space correlation is, the value of activity AC is large.

$$AC = |DP_{L-U} - DP_{C-U}| + |DP_{C-U} - DP_{R-U}| + \\ |DP_L - DP_C| + |DP_C - DP_R| + |DP_{L-L} - DP_{C-L}| + \\ |DP_{C-L} - DP_{R-L}| + |DP_{L-U} - DP_L| + |DP_L - DP_{L-L}| + \\ |DP_{C-U} - DP_C| + |DP_C - DP_{C-L}| + \\ |DP_{R-U} - DP_R| + |DP_R - DP_{R-L}|$$ (13)

Thus, by using activity ACt−1 calculated from the class taps that are extracted from the peripheral images held on the first image-holding unit 331 and activity ACt calculated from the class taps that are extracted from the peripheral images held on the second image-holding unit 332, activity class AL is determined as Equation 14.

$$\text{Activity class } AL = ACt/(ACt-1+Act) \times 100$$ (14)

Further, the class code KA is determined based on the motion direction information vd and the activity class AL.

The pixel-value-extracting section 36 extracts, as described above, at least pixels whose space positions roughly agree with that of the target pixel Pna, from the peripheral images which are held in the first image-holding unit 331 and the second image-holding unit 332, and supplies them to a pixel-value-generating section 38b as prediction taps Ca.

The processing-coefficient-setting section 37b stores beforehand processing coefficients used for motion blur removing for each class code and selects the processing coefficients db corresponding to the class code supplied from the class ca egorization unit 352 to supply them to the pixel-value generating section 38b. When receiving adjustment information BS that can adjust the motion blur as information ET from outside, the processing-coefficient-setting section 37b also switches the processing coefficients to be selected based on this adjustment information BS to adjust motion-blur-removing effects. For example, even if a motion-blur-removing cannot optimally be performed by using the processing coefficients db corresponding to the class code KA, it is possible to remove the motion blur optimally by switching the processing coefficients to other. Further, by switching the processing coefficients, a motion blur can be left intentionally.

The pixel-value-generating section 38b performs calculation of the prediction taps Ca supplied from the pixel-value-extracting section 36 and the processing coefficients db supplied from the processing-coefficient-setting section 37b, to generate a pixel value of a target pixel in a target image. For example, it performs multiply and accumulation calculation of the prediction taps extracted from the peripheral images, which are held on the first image-holding unit 331, and the processing coefficients to generate a pixel value. It also multiply and accumulation calculation of the prediction taps extracted from the peripheral images, which are held on the second image-holding unit 332, and the processing coefficients to generate a pixel value. By integrating these two pixel values, a pixel value of the target pixel is generated and outputted as the image signal DVout.

Thus, by generating the pixel value of the target pixel in the target image by using the pixel values of the main terms of the plural peripheral images, any deterioration on performance for removing the motion blur can be mitigated even if the motion vector of the target pixel cannot be accurately detected, so that it is possible to perform very robust motion blur removing against any shifts in detection of motion vector.

FIG. 20 shows a flowchart when image processing is performed by use of software. A step ST11, the CPU 201 sets a target pixel whose motion blur is to be removed and then proceeds to step ST12. At the step ST12, the CPU 201 detects a motion direction of the target pixel and then, proceeds to step ST 13 At the step ST13, the CPU 201 performs class determination on the target pixel. In this class determination, a class categorization is performed based on the motion direction of the target pixel and pixel values of the class taps set on the peripheral images on the basis of space position of the target pixel, so that the class code can be determined. At step ST14, the CPU 201 extracts pixel values so that the pixel values of the prediction taps set on the peripheral images can be extracted. In other words, the CPU 201 sets pixels in the peripheral images whose space positions roughly agree with that of the target pixel as at least the prediction taps, in order to extract a main term that mainly contains components of a target pixel in a moving object, and extracts the pixel values in the prediction taps.

At step ST15, the CPU 201 sets the processing coefficients corresponding to the motion direction detected at the step ST12 and the class determined at the step ST13, and proceeds to step ST16.

At the step ST16, the CPU 201 performs blur-removing processing on each frame. In other words, the CPU 201 performs calculation of the pixel values of the prediction taps extracted at the step ST14 and the processing coefficients determined at the step ST15 to calculate a blur-removed pixel value and proceeds to step ST17.

At the step ST17, the CPU 201 decides whether blur-removing processing is completed on entire screen and, if the blur-removing processing is not performed yet on any of the pixels, it returns to the step ST11 while if the blur-removing processing is completed on the entire screen, it ends the processing.

The following will describe cases where the processing coefficients to be stored into the processing-coefficient-setting section are obtained through learning to perform blur-removing processing.

FIG. 21 shows a configuration in a case where the blur-removing processing is performed by obtaining the processing coefficients through learning. A learning apparatus 60 performs learning processing by using teacher images and student images obtained by adding any motion blurs to each of the teacher images and stores processing coefficients obtained by this learning into the processing-coefficient-setting section in the image-processing apparatus 20. The image-processing apparatus 20 selects the prediction taps from an image containing a motion blur as an input image so that at least the pixels whose space positions roughly agree with that of the target pixel can be contained and performs calculation processing by using the pixel values in the prediction taps and the processing coefficients stored in the processing-coefficient-setting section, thereby obtaining a pixel value of the blur-removed target pixel. As the teacher images, images shot by using a high-speed imaging camera or still images are used. The student images are generated by treating the image shot by using a high-speed imaging camera as a still image, and integrating the image time-wise. Alternatively, the student images are generated by setting the motion direction and the motion amount, and adding motion blur and noise corresponding to the set motion direction or motion amount to the still image.

Herein, in a case where the student images are generated, in order to improve any robust properties against any shifts in a detection of the motion vector, not only the student images on the motion amount and motion direction for obtaining the processing coefficients but also the student images by changing at least any one of the motion amount and the motion direction are generated so that the processing coefficients can be set through learning by using these student images. If, also, any motion blur removing is performed on an image containing a still object, a student image is generated without adding any motion blur thereto by setting the motion amount to be zero, in order to prevent an image of the still object from being made failure, so that the processing coefficients can be set through learning by using also the student image to which no motion blur is added. It is to be noted that in the learning of the processing coefficients, by changing the learning source to any image signal or the like having HD format or SD format, it is possible to generate optimal coefficients according to each of the image formats.

Figure 22:
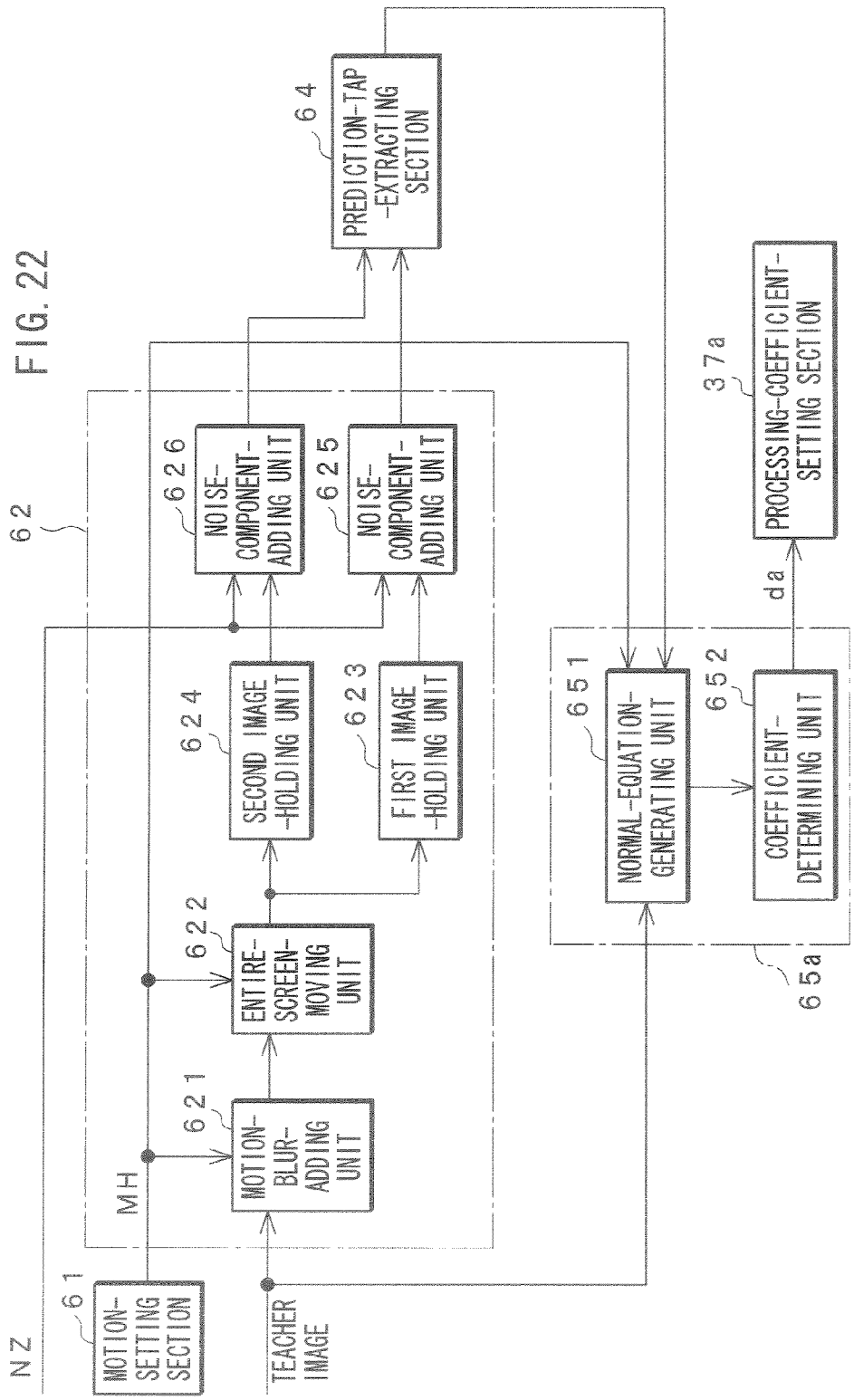
FIG. 22 is a functional block diagram of a learning apparatus.

FIG. 22 shows a functional block diagram of the learning apparatus 60 that generates the processing coefficients and is used when no class determination is performed. A motion-setting section 61 sets the motion direction and the motion amount and supplies a student-image-generating section 62 with motion information MH indicative of the set motion direction and motion amount. Herein, in the setting of the motion direction, for example, plural motion directions, each of which has a desired angle difference, are set. Plural different motion amounts may be respectively set on each of the motion directions.

A motion-blur-adding unit 621 in the student-image-generating section 62 adds a motion blur corresponding to the motion amount and motion amount indicated by the motion information MH into each of the teacher images and supplies it to an entire-screen-moving unit 622. The entire-screen-moving unit 622 moves each of the teacher images into which the motion blur is added by an entire screen by the motion amount in the motion direction based on the motion information MH, to generate the student images.

The student-image-generating section 62 also generates student images obtained by adding no motion blur to the teacher image, in a specific ratio. The student images having a motion blur in a second motion direction near a first motion direction are generated in a specific ratio when a prediction coefficient corresponding to the first motion direction indicated by the motion information MH from the motion-setting section 61 is generated. By switching ratios of the generation of the student images by adding no motion blur and the generation of the student images having a motion blur in the second motion direction, the processing coefficients are further generated.

For example, the student images generated by adding a motion blur into the plural student images in a motion direction indicated in the motion information MH in a second motion direction near a first motion direction indicated by the motion information MH or performing the entire screen moving are contained in a specific ratio. Alternatively, the student images generated by adding a motion blur into the plural student images having the motion direction and the motion amount indicated in the motion information MH corresponding to a motion direction and a motion amount that are different from the motion direction and the motion amount indicated by the motion information MH or performing the entire screen moving are contained in a specific ratio. Thus, if the student images changed their motion directions or their motion directions and motion amounts are contained, it is possible to remove a motion blur, which is difficult to receive any influence of fluctuation in the motion direction and the motion amount. If the student images are generated by setting the motion amount to be zero, it is also possible to remove a motion blur from a still image. By switching ratios of containing a motion direction and a motion amount that are different from the motion direction and the motion amount indicated by the motion information MH to generate the processing coefficients, it is further possible for a user to select the processing coefficients at his or her desired ratio. Thus, if the processing coefficients are generated by switching ratios of containing the motion direction and the motion amount could be selected, it is possible to remove a motion blur as a user like. For example, if the user wants to remove a motion blur in a part of still image, by selecting the processing coefficients generated by increasing a ratio of student images generated by setting the motion amount to be zero, it is possible to remove a motion blur from the part of still image accurately. If a motion blur is removed from a part of motion image having any large fluctuation in a motion direction, by selecting the processing coefficients generated by increasing a ratio of student images having different motion directions, it is also possible to remove a motion blur accurately from the part of motion image having any large fluctuation in a motion direction.

Further, if the student-image-generating section 62 generates student images, two student images are generated so that the teacher image can have the middle phase between those of the two student images. For example, the teacher image into which the motion blur is added is moved by a half the motion amount in a direction opposite to the motion direction indicated by the motion information MH, so that a first student image corresponding to the image of (t–1) frame can be generated. Further, the teacher image into which the motion blur is added is moved by a half the motion amount in the motion direction indicated by the motion information MH, so that a second student image corresponding to, for example, the image of (t) frame can be generated. Thus, generating the student images enables the teacher image to correspond to a target image and the student images to correspond to peripheral images. The first student image generated in the entire-screen-moving unit 622 is stored in the first image-holding unit 623. Further, the second student image generated in the entire-screen-moving unit 622 is stored in the second image-holding unit 624.

Noise-component-adding units 625, 626 carry noise NZ, which has been carried on the image signal DVa, beforehand on the first and second student images to learn the processing coefficients in order to be able to perform the motion-blur-removing processing, even if the noise is carried on image signal DVa, without receiving any influence with the noise. Thus, by providing the noise-component-adding units 625, 626 to perform the learning, it is possible to perform the motion-blur-removing processing accurately with receiving a smaller influence by the noise than that of a case of not providing the noise-component-adding units 625, 626 to perform the learning. By adjusting an amount of noise, it is also possible to change any blur feelings.

Herein, as the noise to be added to the student image, for example, by picking-up a subject having any uniform brightness with a digital camera or a video camera, a base image is generated by accumulating images of the subject. Noise generated by subtracting this base image from each of the picked-up images is used. Using such the noise enables motion blur removing to be efficiently performed on the actually picked-up image.

The prediction-tap-extracting section 64 extracts prediction taps Ca, similar to the above-mentioned pixel-value-extracting section 36, from the first and second student images that have been generated in the student-image-generating section 62 and supplies the pixel values in the prediction taps to the normal-equation-generating unit 651.

The normal-equation-generating unit 651 of the processing-coefficient-generating section 65a generates a normal equation for each motion direction from the pixel values in the prediction taps Ca extracted in the prediction-tap-extracting section 64 and the pixel values of the teacher images and supplies it to a coefficient-determining unit 652. The coefficient-determining unit 652 calculates processing coefficients for each student image based on the normal equation supplied from the normal-equation-generating unit 651 and stores the processing coefficients determined for each student image in the processing-coefficient-setting section 37a for each motion direction, The following will describe the normal-equation-generating unit 651 and the coefficient-determining unit 652.

The above-mentioned pixel-value-generating section 38a performs linear combination indicated by, for example, Equation 15 by using the pixel values in the prediction taps extracted in the pixel-value-extracting section 36 and the processing coefficients supplied from the processing-coefficient-setting section 37a, thereby generating blur-removing-processed pixel values for each peripheral image.

$$q' = \sum_{i=0}^{n} di \times ci \tag{15}$$

In the Equation 15, the term q' indicates pixel values of pixels from which blur is removed. The term, "ci" ("i" is an integer of 1 through n, indicating each of the pixels in a processing range) represents pixel values in the processing region. Further, "di" indicates processing coefficients.

In this Equation 15, before learning, the processing coefficients $d_i$ are respectively undetermined ones. Learning of the processing coefficients is performed by inputting pixels of plural teacher usages (still images). In a case where there are m number of pixels of the teacher images and pixel data of the m number of pixels is described as "$q_k$ (k is an integer of 1 through m)", following Equation 16 is derived from the Equation 15.

$$qk \approx \sum_{i=0}^{n} di \times c_{ik} = q'_k \tag{16}$$

Herein. the Equation 16, by calculating a right side thereof, can obtain blur-removed pixel values $q_k'$, which are approximately equal to actual pixel values $q_k$ containing no motion blur. It is to be noted that an approximately equal symbol, not an equality because the blur-removed pixel values obtained as a result of calculation of the right side do not strictly agree with pixel value on target pixel in an actual image having no motion blur and contain a predetermined error.

In the Equation 16, a processing coefficient $d_i$ that minimizes a sum of squares of the errors, if obtained through learning, is considered to be an optimal coefficient to bring the blur-removed pixel values $q_k$ close to the pixel values having no motion blur. Therefore, for example, by using m (which is an integer larger than n) number of pixel values $q_k$ gathered through the learning, such an optimal processing coefficient $d_i$ is determined according to the least-squares method.

A normal equation to obtain the processing coefficients $d_i$ in the right side of the Equation 16 according to the least-squares method can be given as Equation 17.

$$\begin{bmatrix} \sum_{k=1}^{m} c_{1k} \times c_{1k} & \sum_{k=1}^{m} c_{1k} \times c_{2k} & \cdots & \sum_{k=1}^{m} c_{1k} \times c_{nk} \\ \sum_{k=1}^{m} c_{2k} \times c_{1k} & \sum_{k=1}^{m} c_{2k} \times c_{2k} & \cdots & \sum_{k=1}^{m} c_{2k} \times c_{nk} \\ \vdots & \vdots & & \vdots \\ \sum_{k=1}^{m} c_{nk} \times c_{1k} & \sum_{k=1}^{m} c_{nk} \times c_{2k} & \cdots & \sum_{k=1}^{m} c_{nk} \times c_{nk} \end{bmatrix} \begin{bmatrix} d_1 \\ d_2 \\ \vdots \\ d_n \end{bmatrix} = \begin{bmatrix} \sum_{k=1}^{m} c_{1k} \times q_k \\ \sum_{k=1}^{m} c_{2k} \times q_k \\ \vdots \\ \sum_{k=1}^{m} c_{nk} \times q_k \end{bmatrix} \quad (17)$$

Therefore, by solving the normal equation indicated in the Equation 17, the processing coefficients $d_i$ can be determined. Specifically, if matrixes of the normal equation indicated in the Equation 17 are respectively defined as following Equations 18 to 20, the normal equation is given as following Equation 21.

$$C_{MAT} = \begin{bmatrix} \sum_{k=1}^{m} c_{1k} \times c_{1k} & \sum_{k=1}^{m} c_{1k} \times c_{2k} & \cdots & \sum_{k=1}^{m} c_{1k} \times c_{nk} \\ \sum_{k=1}^{m} c_{2k} \times c_{1k} & \sum_{k=1}^{m} c_{2k} \times c_{2k} & \cdots & \sum_{k=1}^{m} c_{2k} \times c_{nk} \\ \vdots & \vdots & & \vdots \\ \sum_{k=1}^{m} c_{nk} \times c_{1k} & \sum_{k=1}^{m} c_{nk} \times c_{2k} & \cdots & \sum_{k=1}^{m} c_{nk} \times c_{nk} \end{bmatrix} \quad (18)$$

$$D_{MAT} = \begin{bmatrix} d1 \\ d2 \\ M \\ M \\ dn \end{bmatrix} \quad (19)$$

$$Q_{MAT} = \begin{bmatrix} \sum_{k=1}^{m} c_{1k} \times q_k \\ \sum_{k=1}^{m} c_{2k} \times q_k \\ \vdots \\ \sum_{k=1}^{m} c_{nk} \times q_k \end{bmatrix} \quad (20)$$

$$C_{MAT} D_{MAT} = Q_{MAT} \quad (21)$$

As indicated in the Equation 19, elements of the matrix $D_{MAT}$ are the processing coefficients $d_i$ to be obtained. Therefore, in the Equation 21, once the matrix $C_{MAT}$ on the left side and the matrix $Q_{MAT}$ on the right side are determined, it is possible to calculate the matrix $D_{MAT}$ (i.e., the processing coefficients $d_i$) by any matrix solving methods. Specifically, as indicated in the Equation 18, elements of the matrix $C_{MAT}$ can be calculated if prediction taps $c_{ik}$ are already known. Since the prediction taps $c_{ik}$ are extracted by the prediction-tap-extracting section 64, the normal-equation-generating unit 651 can calculate the elements of matrix $C_{MAT}$ by utilizing the respective prediction taps $c_{ik}$ supplied from the prediction-tap-extracting section 64.

Also, as indicated in the Equation 20, elements of the matrix $Q_{MAT}$ can be calculated if the prediction taps $c_{ik}$ and the pixel values $q_k$ of the still images are already known. The prediction taps $c_{ik}$ are the same as those included in the elements of matrix $C_{MAT}$ and the pixel values $q_k$ correspond to pixels of the teacher images with respect to target pixels (pixels of the student images contained in each of the prediction taps $c_{ik}$. Therefore, the normal-equation-generating unit 651 can calculate the elements of matrix $Q_{MAT}$ by utilizing the prediction taps $c_{ik}$ supplied from the prediction-tap-extracting section 64 and the teacher images.

Thus, the normal-equation-generating unit 651 calculates the elements of matrixes $C_{MAT}$ and $Q_{MAT}$ and supplies results of the calculations to the coefficient-determining unit 652.

The coefficient-determining unit 652 calculates the processing coefficients $d_i$, which are the elements of matrix $D_{MAT}$ of the above-mentioned Equation 19. Specifically, the normal equation of the above-mentioned Equation 21 can be changed into following Equation 22.

$$D_{MAT} = C_{MAT}^{-1} Q_{MAT} \quad (22)$$

In the Equation 22, the elements of matrix $D_{MAT}$ of the left side are the processing coefficients $d_i$ to be obtained. Further, the elements of matrixes $C_{MAT}$ and $Q_{MAT}$ are respectively supplied from the normal-equation-generating unit 651. Therefore, when having been supplied with the respective elements of matrixes $C_{MAT}$ and $Q_{MAT}$ from the normal-equation-generating unit 651, the coefficient-determining unit 652 calculates matrixes of the right side of the Equation 22 to calculate the matrix $D_{MAT}$ and stores a result of the calculation (processing coefficients $d_i$) in the processing-coefficient-setting section 37a. Further, if the above-mentioned learning is performed by switching the motion direction set in the motion-setting section 61, it is possible to store processing coefficients that predicts target pixels in the teacher images from the pixel values of the prediction taps based on a relationship between plural pairs of the pixel values of the prediction taps and the target pixels in the teacher images, for at least each motion direction, in the processing-coefficient-setting section.

Further, the processing coefficients are stored for each motion direction in the processing-coefficient-setting section 37a corresponding to the noises added in the student-image-generating section. If the processing coefficients are thus stored for each motion direction corresponding to the noises, it is possible to switch the processing coefficients to be selected based on the adjustment information BS, as described above.

Figure 23:
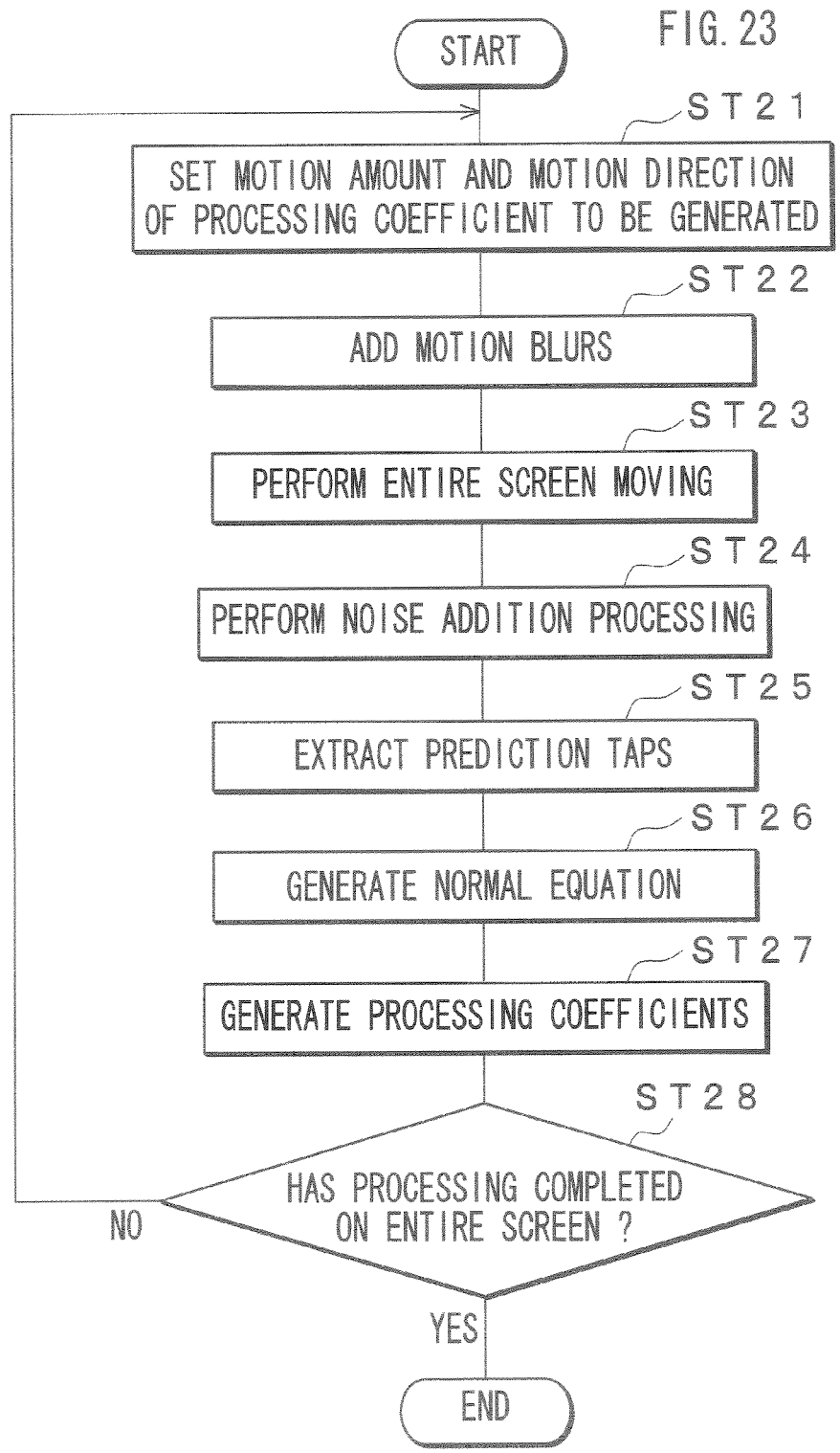
FIG. 23 is a flowchart for showing learning processing.

FIG. 23 is a flowchart for showing learning processing performed in the learning apparatus. At step ST21, a motion direction and a motion amount of the processing coefficient to be generated are set.

At step ST22, motion blurs are added so that the motion blurs are added to the teacher images corresponding to the motion amount set at the step ST21.

At step ST23, entire screen moving is performed so that the teacher images to which the motion blurs are added at the step ST22 are entire-screen-moved based on the motion direction and the motion amount set at the step ST21 to generate the student images corresponding to the peripheral images. In this generation of these student images, by changing at least any one of the set motion direction and motion amount in a specific ratio, based on the changed motion direction and motion amount, the student images are generated by adding the motion blurs or performing entire-screen-moving. The student images are also generated in a specific ratio by setting the motion amount to be zero.

At step ST24, noise addition processing is performed so that the noises are added to the student images.

At step ST25, prediction taps are extracted from the student images to which the noises are added. At step ST26, a normal equation is generated for at least each motion direction using the teacher images and the extracted prediction taps. At step ST27, the normal equation is solved to thereby determine the processing coefficients.

Ar step ST28, it is determined whether the processing is performed on entire screen and, if the processing is not performed yet on the entire screen, processing starting from step ST21 repeats on new pixels while if the processing is completed on the entire screen, the learning processing ends.

Thus, when the processing coefficients corresponding to the specified motion amount and motion direction are learned, by containing in leaning sources not only the student images of the specified motion amount and motion direction but also the student images having an error from the specified motion amount and motion direction, it is possible to improve any robust properties against the detection error of the motion vector, so that if the detected motion vector has any error, any excellent motion blur removing is enabled.

Further, by containing in leaning sources the student images to which no motion blur is added by setting the motion amount to be zero, it is possible to improve any robust properties against any failure of the still image, so that if the detected motion vector has any error, it prevents any failure of the still image from occurring when the motion blur removing is performed. Additionally, by adjusting an amount of noise to be added in any learning of the processing coefficients, it is possible to change any blur feelings, or by adjusting a ratio of student images having different blur amounts, it is possible to crate any new blur feelings.

Figure 24:
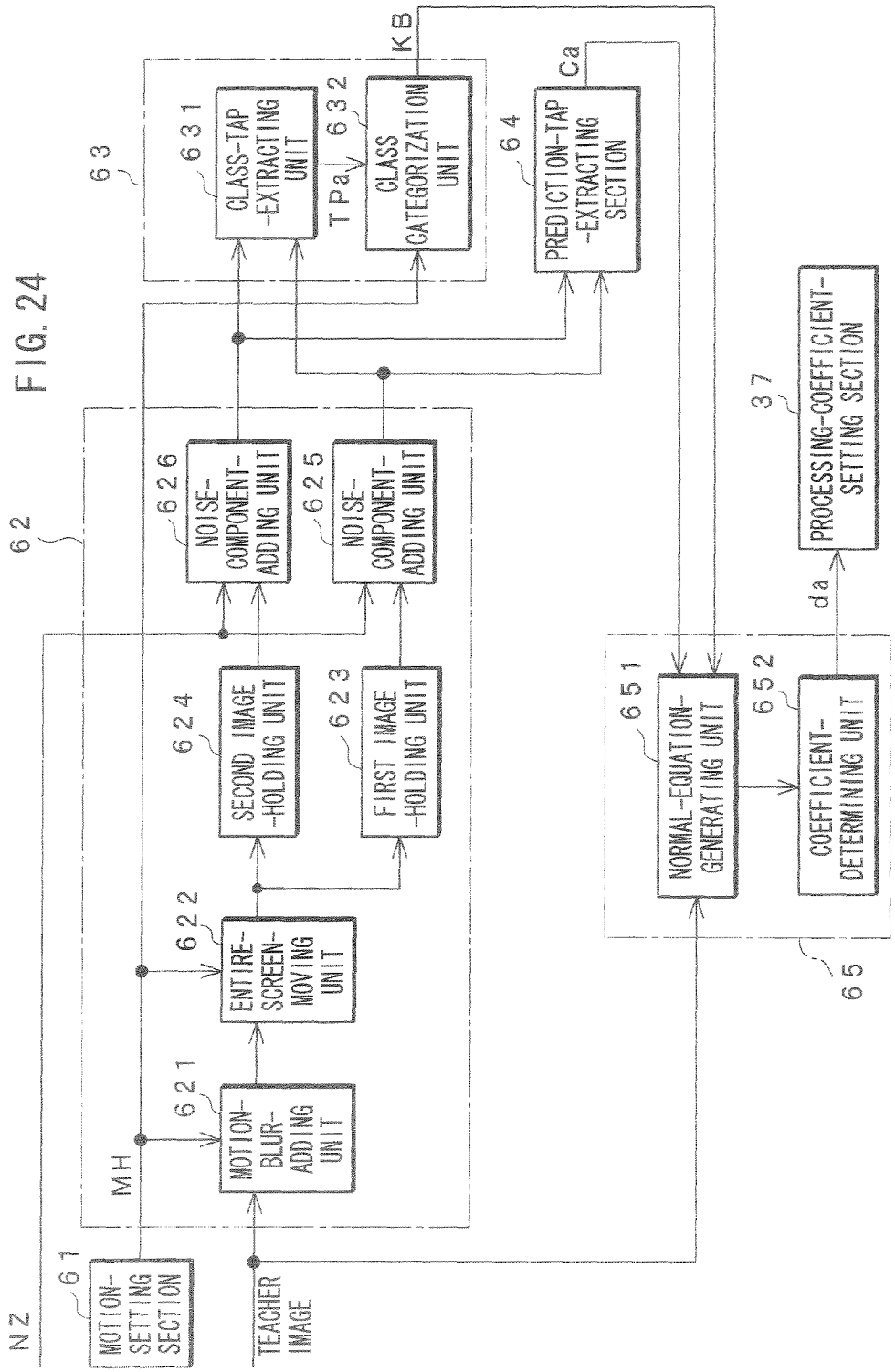
FIG. 24 is a functional block diagram of learning apparatus in a case where class determination is performed)

Next, FIG. 24 shows a functional block diagram of the learning apparatus 60 that generates the processing coefficients used when performing a class determination. It is to be noted that components in FIG. 24 that correspond to those of FIG. 22 are indicated by the same symbols, detailed descriptions of which will be omitted.

A class-determining section 63 determines class code KB to the target pixel similar to the above-mentioned class-determining section 35, and supplies it to a normal-equation-generating unit 651 of the processing-coefficient-generating section 65.

The prediction-tap-extracting section 64 extracts prediction taps Ca, similar to the above-mentioned pixel-value-extracting section 36, from the first and second student images that have been generated in the student-image-generating section 62 and supplies the pixel values in the prediction taps to the normal-equation-generating unit 651.

The normal-equation-generating unit 651 of the processing-coefficient-generating section 65 generates a normal equation for each class code from the pixel values in the prediction taps Ca extracted in the prediction-tap-extracting section 64 and the pixel values of the teacher images and supplies it to a coefficient-determining unit 652. The coefficient-determining unit 652 calculates processing coefficients based on the normal equation supplied from the normal-equation-generating unit 651 and stores the plural pairs of processing coefficients thus obtained in the processing-coefficient-setting section 37. By switching the motion direction to generate the processing coefficients, the plural pairs of processing coefficients corresponding to the motion direction and the class can be also stored in the processing-coefficient-setting section 37. Alternatively, by switching the motion amount to generate the processing coefficients, it is possible to obtain the more accurate processing coefficients.

The processing coefficients are classified based on the noises that are added in the student-age-generating section, and stored in the processing-coefficient-setting section 37. If the processing coefficients are thus classified based on the noises, it is possible to switch the processing coefficients to be selected, by changing the class to another based on the adjustment information BS.

FIG. 25 is a flowchart for showing learning processing performed in the learning apparatus (in a case where class determination is performed) At step ST31, a motion direction and a motion amount of the processing coefficient to be generated are set.

At step ST32, motion blurs are added so that the motion blurs are added to the teacher images corresponding to the motion amount set at the step ST31. At step ST33, entire screen moving is performed so that the teacher images to which the motion blurs are added at the step ST32 are entire-screen-moved based on the motion direction and the motion amount set at the step ST31 to generate the student images corresponding to the peripheral images. In this generation of these student images, by changing at least any one of the set motion direction and motion amount in a specific ratio, based on the changed motion direction and motion amount, the student images are generated by adding the motion blurs or performing entire-screen-moving. The student images are also generated in a specific ratio by setting the motion amount to be zero.

At step ST34, noise addition processing is performed so that the noises are added to the student images.

At step ST35, class determination processing is performed so that a class code is determined for each pixel by using the student images to which the noises are added.

At step ST36, prediction taps are extracted from the student images to which the noises are added. At step ST37, a normal equation is generated for each class using the teacher images and the extracted prediction taps. At step ST38, the normal equation is solved to thereby determine processing coefficients.

At step ST39, it is determined whether the processing is performed on entire screen and, if the processing is not performed yet on the entire screen, processing starting from step ST31 repeats on new pixels while if the processing is completed or the entire screen, the learning processing ends.

Thus, when the processing coefficients corresponding to the specified motion amount and motion direction are learned, by containing in leaning sources not only the student images of the specified motion amount and motion direction but also the student images having an error from the specified motion amount and motion direction, it is possible to improve any robust properties against the detection error of the motion vector, so that if the detected motion vector has any error, an excellent motion blur removing is enabled.

INDUSTRIAL APPLICABILITY

As described above, a learning apparatus, learning method and learning program according to the present invention may be useful in extracting information embedded into an image signal that can be obtained by pick-up imaging on a real society with an image sensor and be suitable for obtaining an image from which motion blurs are removed.

The invention claimed is:

1. A learning apparatus, comprising:
a non-transitory memory storing teacher images;
a motion-amount-setting section configured to set a motion amount;
a motion-direction-setting section configured to set a motion direction;
a student-image-generating section configured to generate a plurality of student images by adding a motion blur to the teacher images based on the set motion amount and the set motion direction, and by not adding the motion blur to the teacher images, wherein a ratio of a number of student images generated by not adding the motion blur to a number of student images generated by adding the motion blur is predetermined;
a prediction-tap-extracting section configured to extract a pixel value of a pixel in each student image whose space position substantially agrees with a space position of a target pixel in a corresponding teacher image; and
a coefficient-generating section configured to generate processing coefficients for predicting the target pixel in the corresponding teacher image from the pixel value of the pixel extracted by the prediction-tap-extracting section for the motion direction, based on a relationship between plural pairs of the pixel value of the pixel extracted by the prediction-tap-extracting section and the target pixel in the corresponding teacher image.

2. The learning apparatus according to claim 1, wherein the student-image-generating section is configured to generate a student image having a motion blur in a second motion direction near a first motion direction when a prediction coefficient corresponding to the first motion direction is generated.

3. The learning apparatus according to claim 1, wherein the student-image-generating section further adds noise to the student images.

4. The learning apparatus according to claim 1, wherein the prediction-tap-extracting section is configured to extract pixel values of first plural pixels in each student image when the student image has an interlace format; and
wherein the prediction-tap-extracting section is configured to extract pixel values of second plural pixels in the student image when the student image has a progressive format.

5. The learning apparatus according to claim 1, further comprising a class-determining section configured to determine a class of the target pixel based on a pixel value of the pixel in each student image that corresponds to the target pixel in the corresponding teacher image,
wherein the processing-coefficient-generating section is configured to generate the processing coefficient for predicting the target pixel in the corresponding teacher image for each class detected by the class-determining section.

6. The learning apparatus according to claim 5, wherein the class-determining section is configured to determine a class of the target pixel corresponding to an activity of pixel values of pixels in each student image that correspond to the target pixel in the corresponding teacher image.

7. A learning method, comprising:
setting a motion amount;
setting a motion direction;
generating a plurality of student images by adding a motion blur to teacher images based on the set motion amount and the set motion direction, and by not adding the motion blur to the teacher images, wherein a ratio of a number of student images generated by not adding the motion blur to a number of student images generated by adding the motion blur is predetermined;
a pixel value of a pixel in each student image whose space position substantially agrees with a space position of a target pixel in a corresponding teacher image; and
generating processing coefficients for predicting the target pixel in the corresponding teacher image from the pixel value of the pixel extracted in the prediction-tap-extracting step for the motion direction, based on a relationship between plural pairs of the pixel value of the pixel extracted by the prediction-tap-extracting step and the target pixel in the corresponding teacher image.

8. A non-transitory computer-readable medium storing a learning program that, when executed by a computer, causes the computer to perform the steps of:
setting a motion amount;
setting a motion direction;
generating a plurality of student images by adding a motion blur to teacher images based on the set motion amount and the set motion direction, and by not adding the motion blur to the teacher images, wherein a ratio of a number of student images generated by not adding the motion blur to a number of student images generated by adding the motion blur is predetermined;
a pixel value of a pixel in each student image whose space position substantially agrees with space position of a target pixel in a corresponding teacher image; and
generating processing coefficients for predicting the target pixel in the corresponding teacher image from the pixel value of the pixel extracted in the prediction-tap-extracting step for the motion direction, based on a relationship between plural pairs of the pixel value of the pixel extracted by the prediction-tap-extracting step and the target pixel in the corresponding teacher image.

* * * * *